US012764724B2

(12) United States Patent

Wu et al.

(10) Patent No.: US 12,764,724 B2

(45) Date of Patent: Oct. 13, 2026

(54) METHOD AND DEVICE IN NODES USED FOR WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI CODUS TECHNOLOGY COMPANY LIMITED, Shanghai (CN)

( * ) Notice: Subject to any disclaimer, the term of this patent is extended or adjusted under 35 U.S.C. 154(b) by 257 days.

(21) Appl. No.: 18/770,682

(22) Filed: Jul. 12, 2024

(65) Prior Publication Data

US 2024/0365299 A1 Oct. 31, 2024

Related U.S. Application Data

(63) Continuation of application No. PCT/CN2023/072009, filed on Jan. 13, 2023.

(30) Foreign Application Priority Data

Jan. 14, 2022 (CN) ......................... 202210042344.3

(51) Int. Cl.

*H04W 72/04* (2023.01)

*H04L 5/00* (2006.01)

(Continued)

(52) U.S. Cl.

CPC ....... *H04W 72/0446* (2013.01); *H04L 5/0051* (2013.01); *H04W 72/0453* (2013.01)

(58) Field of Classification Search

None

See application file for complete search history.

(56) References Cited

U.S. PATENT DOCUMENTS

2014/0355709 A1* 12/2014 Liu ..................... H04L 25/0226 375/267

2015/0318972 A1* 11/2015 Zhang ................... H04W 80/04 370/329

(Continued)

FOREIGN PATENT DOCUMENTS

| | | |
|---|---|---|
| CN | 110535577 A | 12/2019 |
| CN | 111818639 A | 10/2020 |
| CN | 113162736 A | 7/2021 |

OTHER PUBLICATIONS

ISR received in application No. PCT/CN2023/072009 dated Apr. 27, 2023.

*Primary Examiner* — Sai Aung

(74) *Attorney, Agent, or Firm* — Abd Almonem Doolaanea

(57) ABSTRACT

A method and device in anode for wireless communications. A first node receives a first signaling, transmits a target signal and a target reference signal group in a target time-frequency resource block; a number of layer(s) of the target signal is equal to a sum of a number of layer(s) of a first sub-signal and a number of layer(s) of a second sub-signal; a first reference signal resource group is used to determine antenna port(s) for transmitting the first sub-signal, and a second reference signal resource group is used to determine antenna port(s) for transmitting the second sub-signal; the target reference signal group comprises P reference signals; a first reference signal is a reference signal transmitted by a first antenna port among the P reference signals; transmit power of the first reference signal on a first RE is linearly correlated with a linear value of a first factor.

20 Claims, 5 Drawing Sheets

(51) Int. Cl.

| | |
|---|---|
| ***H04W 72/0446*** | (2023.01) |
| ***H04W 72/0453*** | (2023.01) |
| ***H04W 72/12*** | (2023.01) |

(56) References Cited

U.S. PATENT DOCUMENTS

2016/0088512 A1 3/2016 Bergström et al.
2018/0041323 A1* 2/2018 Wang ................ H04W 72/0446
2018/0316405 A1* 11/2018 Li .......................... H04B 7/065
2019/0173642 A1* 6/2019 Zhang ................... H04L 5/0053
2019/0280746 A1* 9/2019 Zhang ...................... H04B 7/06
2021/0336656 A1* 10/2021 Ji .......................... H04L 5/0048

* cited by examiner

P1 + P2 = P

P1 is number of antenna port(s) associated with the first reference signal resource group among the P antenna ports P2 is number of antenna port(s) associated with the second reference signal resource group among the P antenna ports The first factor —being related to→ the P and the P1

(a)When the first antenna port is associated with the first reference signal resource group The first factor —being related to→ the P and the P2

(b)When the first antenna port is associated with the second reference signal resource group

FIG.7

First factor = Second factor + Third factor

The second factor —being related to→ Number of layer(s) of the first sub-signal

The third factor —being related to→ Ratio of the P to the P1

(a) When the first antenna port is associated with the first reference signal resource group The second factor —being related to→ Number of layer(s) of the second sub-signal The third factor —being related to→ Ratio of the P to the P2

(b) When the first antenna port is associated with the second reference signal resource group

FIG. 8

First condition comprises: occupied time-domain resources comprise time-domain resources occupied by the first resource element, and corresponding antenna port(s) and the first antenna port are respectively associated with different reference signal resource groups in the first reference signal resource group and the second reference signal resource group First factor=Second factor+Third factor (a) When there exists a reference signal satisfying the first condition other than the first reference signal among the P reference signals First factor=Second factor (b) When there does not exist reference signal satisfying the first condition other than the first reference signal among the P reference signals

FIG. 9

METHOD AND DEVICE IN NODES USED FOR WIRELESS COMMUNICATION

CROSS REFERENCE TO RELATED APPLICATIONS

This application is the continuation of the international patent application No. PCT/CN2023/072009, filed on Jan. 13, 2023, and claims the priority benefit of Chinese Patent Application 202210042344.3, filed on Jan. 14, 2022, the full disclosure of which is incorporated herein by reference.

BACKGROUND

Technical Field

The present application relates to transmission methods and devices in wireless communication systems, and in particular to a transmission method and device of a radio signal in a wireless communication system supporting cellular networks.

Related Art

In 5G NR (New Radio) system, multiple antenna panels will be configured for both base station and terminal. NR Rel-16 standard can already support the base station to transmit radio signals through multiple antenna panels at the same time, but the terminal only supports transmission based on antenna panel selection even if it is configured with multiple antenna panels, i.e., radio transmission is only allowed to be performed on one antenna panel at the same time. In the future evolution of 5G NR systems, supporting the simultaneous transmission of radio signals on multiple antenna panels on both base station and terminal to improve system capacity is an important technical direction.

SUMMARY

Inventors have found through researches that how to support parallel transmission of multiple signals is a key issue that needs to be addressed.

To address the above problem, the present application provides a solution. It should be noted that although the uplink and downlink is used as an example in the above description, the present application is also applicable to other scenarios, such as sidelink, where similar technical effects can be achieved. Additionally, the adoption of a unified solution for various scenarios (including but not limited to Downlink, Uplink and Sidelink) contributes to the reduction of hardcore complexity and costs. If no conflict is incurred, embodiments in any node in the present application and the characteristics of the embodiments are also applicable to any other node, and vice versa. And the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

receiving a first signaling, the first signaling being used to indicate a target time-frequency resource block; and transmitting a target signal and a target reference signal group in the target time-frequency resource block;

herein, the target time-frequency resource block comprises multiple Resource elements (REs); the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, and the P reference signals are respectively transmitted by P antenna ports, P being a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

In one embodiment, a problem to be solved in the present application comprises: transmit power under parallel transmission of multiple signals.

According to one aspect of the present application, it is characterized in that a ratio of the transmit power of the first reference signal on the first RE to a reference power is equal to the linear value of the first factor; the reference power is related to whether the first antenna port is associated with the first reference signal resource group or is associated with the second reference signal resource group; when the first antenna port is associated with the first reference signal resource group, the reference power is transmit power of the first sub-signal per layer per RE; when the first antenna port is associated with the second reference signal resource group, the reference power is transmit power of the second sub-signal per layer per RE.

According to one aspect of the present application, it is characterized in that P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; when the first antenna port is associated with the first reference signal resource group, the first factor is also related to the P and the P1; when the first antenna port is associated with the second reference signal resource group, the first factor is also related to the P and the P2.

According to one aspect of the present application, it is characterized in that the first factor is equal to a sum of a second factor and a third factor; when the first antenna port is associated with the first reference signal resource group, the second factor is related to the number of layer(s) of the first sub-signal, and the third factor is related to a ratio of the P to the P1; when the first antenna port is associated with the second reference signal resource group, the second factor is related to the number of layer(s) of the second sub-signal, and the third factor is related to a ratio of the P to the P2.

According to one aspect of the present application, it is characterized in that the first factor is related to whether there exists a reference signal satisfying a first condition other than the first reference signal among the P reference signals; when there exists a reference signal satisfying the first condition other than the first reference signal among the P reference signals, the first factor is equal to a sum of a second factor and a third factor; when there does not exist a reference signal satisfying the first condition other than the first reference signal among the P reference signals, the first factor is equal to the second factor; the first condition comprises: occupied time-domain resources comprise time-domain resources occupied by the first RE, and a corresponding antenna port and the first antenna port are respectively associated with different reference signal resource groups in the first reference signal resource group and the second reference signal resource group; when the first antenna port is associated with the first reference signal resource group, the second factor is related to the number of layer(s) of the first sub-signal; when the first antenna port is associated with the second reference signal resource group, the second factor is related to the number of layer(s) of the second sub-signal.

According to one aspect of the present application, it is characterized in that the third factor is related to the P1 and the P2;

or, the third factor is related to whether the first antenna port is associated with the first reference signal resource group or is associated with the second reference signal resource group; when the first antenna port is associated with the first reference signal resource group, the third factor is related to a ratio of the P to the P1; when the first antenna port is associated with the second reference signal resource group, the third factor is related to a ratio of the P to the P2.

According to one aspect of the present application, comprising:

transmitting a first demodulation reference signal and a second demodulation reference signal in the target time-frequency resource block;

herein, the phrase that "the first antenna port is associated with the first reference signal resource group" comprises: the first antenna port is associated with an antenna port of the first demodulation reference signal; the phrase that "the first antenna port is associated with the second reference signal resource group" comprises: the first antenna port is associated with an antenna port of the second demodulation reference signal.

The present application provides a method in a second node for wireless communications, comprising:

transmitting a first signaling, the first signaling being used to indicate a target time-frequency resource block; and receiving a target signal and a target reference signal group in the target time-frequency resource block;

herein, the target time-frequency resource block comprises multiple REs; the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, and the P reference signals are respectively transmitted by P antenna ports, P being a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

According to one aspect of the present application, it is characterized in that a ratio of the transmit power of the first reference signal on the first RE to a reference power is equal to the linear value of the first factor; the reference power is related to whether the first antenna port is associated with the first reference signal resource group or is associated with the second reference signal resource group; when the first antenna port is associated with the first reference signal resource group, the reference power is transmit power of the first sub-signal per layer per RE; when the first antenna port is associated with the second reference signal resource group, the reference power is transmit power of the second sub-signal per layer per RE.

According to one aspect of the present application, it is characterized in that P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; when the first antenna port is associated with the first reference signal resource group, the first factor is also related to the P and the P1; when the first antenna port is associated with the second reference signal resource group, the first factor is also related to the P and the P2.

According to one aspect of the present application, it is characterized in that the first factor is equal to a sum of a second factor and a third factor; when the first antenna port is associated with the first reference signal resource group, the second factor is related to the number of layer(s) of the first sub-signal, and the third factor is related to a ratio of the P to the P1; when the first antenna port is associated with the second reference signal resource group, the second factor is related to the number of layer(s) of the second sub-signal, and the third factor is related to a ratio of the P to the P2.

According to one aspect of the present application, it is characterized in that the first factor is related to whether there exists a reference signal satisfying a first condition other than the first reference signal among the P reference signals; when there exists a reference signal satisfying the first condition other than the first reference signal among the P reference signals, the first factor is equal to a sum of a second factor and a third factor; when there does not exist a reference signal satisfying the first condition other than the first reference signal among the P reference signals, the first factor is equal to the second factor; the first condition comprises: occupied time-domain resources comprise time-domain resources occupied by the first RE, and a corresponding antenna port and the first antenna port are respectively associated with different reference signal resource groups in the first reference signal resource group and the second reference signal resource group; when the first antenna port is associated with the first reference signal resource group, the second factor is related to the number of layer(s) of the first sub-signal; when the first antenna port is associated with the second reference signal resource group, the second factor is related to the number of layer(s) of the second sub-signal.

According to one aspect of the present application, it is characterized in that the third factor is related to the P1 and the P2;

or, the third factor is related to whether the first antenna port is associated with the first reference signal resource group or is associated with the second reference signal resource group; when the first antenna port is associated with the first reference signal resource group, the third factor is related to a ratio of the P to the P1; when the first antenna port is associated with the second reference signal resource group, the third factor is related to a ratio of the P to the P2.

According to one aspect of the present application, comprising:

receiving a first demodulation reference signal and a second demodulation reference signal in the target time-frequency resource block;

herein, the phrase that "the first antenna port is associated with the first reference signal resource group" comprises: the first antenna port is associated with an antenna port of the first demodulation reference signal; the phrase that "the first antenna port is associated with the second reference signal resource group" comprises: the first antenna port is associated with an antenna port of the second demodulation reference signal.

The present application provides a first node for wireless communications, comprising:

a first receiver, receiving a first signaling, the first signaling being used to indicate a target time-frequency resource block; and a first transmitter, transmitting a target signal and a target reference signal group in the target time-frequency resource block;

herein, the target time-frequency resource block comprises multiple REs; the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, and the P reference signals are respectively transmitted by P antenna ports, P being a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

The present application provides a second node for wireless communications, comprising:

a second transmitter, transmitting a first signaling, the first signaling being used to indicate a target time-frequency resource block; and a second receiver, receiving a target signal and a target reference signal group in the target time-frequency resource block;

herein, the target time-frequency resource block comprises multiple REs; the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, and the P reference signals are respectively transmitted by P antenna ports, P being a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

In one embodiment, the present application has the following advantages over conventional schemes:

the proposed transmit power scheme takes into account the factors of beam direction, antenna panel, and transmitting/receiving nodes, and is suitable for parallel transmission under multi-beam directions, multi-antenna panel, and multi-transmitting/receiving nodes.

BRIEF DESCRIPTION OF THE DRAWINGS

Other features, objects and advantages of the present application will become more apparent from the detailed description of non-restrictive embodiments taken in conjunction with the following drawings:

FIG. 7 illustrates a schematic diagram of a first factor according to one embodiment of the present application;

FIG. 8 illustrates a schematic diagram of a first factor according to another embodiment of the present application;

FIG. 9 illustrates a schematic diagram of a first factor according to another embodiment of the present application;

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
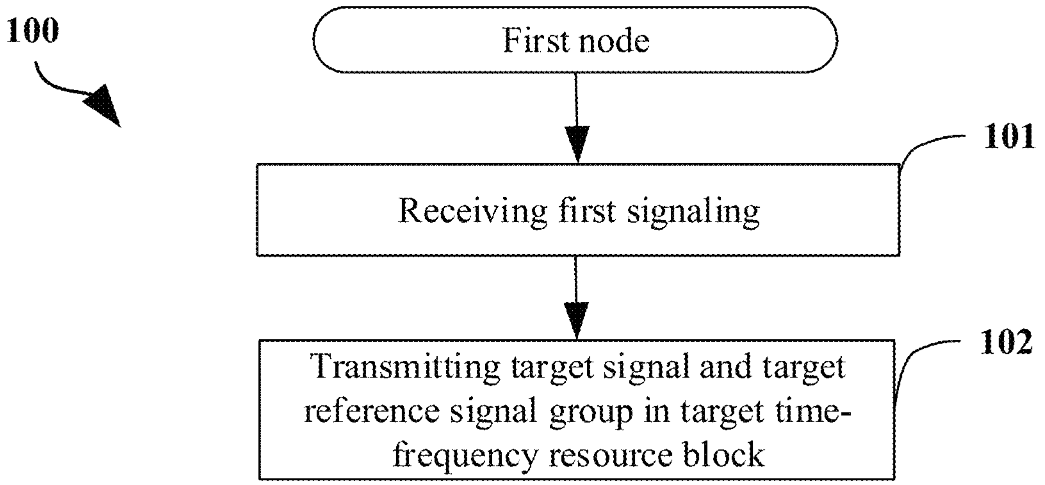
FIG. 1 illustrates a flowchart of a first signaling, a target signal and a target reference signal group according to one embodiment of the present application.

Embodiment 1 illustrates a flowchart of a first signaling, a target signal and a target reference signal group according to one embodiment of the present application, as shown in FIG. 1. In step 100 illustrated by FIG. 1, each box represents a step.

In Embodiment 1, the first node in the present application receives a first signaling in step 101; transmits a target signal and a target reference signal group in the target time-frequency resource block in step 102; herein, the first signaling is used to indicate a target time-frequency resource block; the target time-frequency resource block comprises multiple REs; the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, and the P reference signals are respectively transmitted by P antenna ports, P being a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

In one embodiment, the first signaling is a physical-layer signaling.

In one embodiment, the first signaling is a Downlink Control Information (DCI) signaling.

In one embodiment, the first signaling is a DCI signaling used to schedule a PUSCH (Physical Uplink Shared CHannel).

In one embodiment, the first signaling is transmitted on a Physical Downlink Control Channel (PDCCH).

In one embodiment, a Resource element (RE) occupies a subcarrier in frequency domain, and occupies a symbol in time domain.

In one embodiment, the symbol is a single carrier symbol.

In one embodiment, the symbol is a multicarrier symbol.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multi-carrier symbol is a Filter Bank Multi-Carrier (FBMC) symbol.

In one embodiment, the multicarrier symbol comprises a Cyclic Prefix (CP).

In one embodiment, the first signaling indicates frequency-domain resources occupied by the target time-frequency resource block and time-domain resources occupied by the target time-frequency resource block.

In one embodiment, the first signaling comprises a first field and a second field, the first signaling comprises the first field, the first field comprises at least one bit, and the second field comprises at least one bit; the first field comprised in the first signaling indicates frequency-domain resources occupied by the target time-frequency resource block; the second field comprised in the first signaling indicates time-domain resources occupied by the target time-frequency resource block.

In one embodiment, the first field is a Frequency domain resource assignment field, and the second field is a Time domain resource assignment field.

In one embodiment, for specific meanings of the Frequency domain resource assignment field and the Time domain resource assignment field, refer to chapter 6.1.2 in 3GPP TS38.214.

In one embodiment, the phrase of "occupied frequency-domain resources" refers to: occupied Resource Block (RB).

In one embodiment, the phrase of "occupied frequency-domain resources" refers to: an occupied subcarrier.

Typically, the phrase of "occupied time-domain resources" refers to: an occupied symbol.

In one embodiment, the target signal occupies one PUSCH.

In one embodiment, the target signal is transmitted on a PUSCH.

In one embodiment, the target signal carries at least one transport block.

In one embodiment, the target signal carries a Transport Block (TB).

In one embodiment, the target signal carries two TBs, and the first sub-signal and the second sub-signal respectively carry the two TBs.

In one embodiment, the first sub-signal and the second sub-signal respectively occupy different layers of a PUSCH.

In one embodiment, on a PUSCH transmitting the target signal, any layer occupied by the first sub-signal is different from any layer occupied by the second sub-signal.

In one embodiment, the first sub-signal and second sub-signal are space division multiplexed.

In one embodiment, the first sub-signal and second sub-signal are overlapping.

In one embodiment, the first sub-signal and the second sub-signal occupy same REs.

In one embodiment, the first sub-signal and the second sub-signal are partially or fully overlapping.

In one embodiment, a number of layer(s) of the target signal is equal to a rank of the target signal.

In one embodiment, a rank of the target signal is r, and the target signal comprises r layers; the first sub-signal comprises r1 layer(s) in the r layers, and the second sub-signal comprises r−r1 layer(s) other than the r1 layer(s) in the r layers; r is a positive integer greater than 1, and r1 is a positive integer less than r.

Typically, for the definition of the layer, refer to chapters 5 and 6 in 3GPP TS38.214.

In one embodiment, when the transmission scheme of the target signal is codebook based uplink transmission, both the transmission scheme of the first sub-signal and the transmission scheme of the second sub-signal are codebook based uplink transmission.

In one embodiment, when the transmission scheme of the target signal is Non-codebook based uplink transmission, both the transmission scheme of the first sub-signal and the transmission scheme of the second sub-signal are Non-codebook based uplink transmission.

In one embodiment, the transmission scheme comprises codebook based uplink transmission and non-codebook based uplink transmission.

In one embodiment, the transmission scheme of the first sub-signal is codebook based uplink transmission.

In one embodiment, the transmission scheme of the first sub-signal is Non-codebook based uplink transmission.

In one embodiment, the transmission scheme of the first sub-signal is codebook based uplink transmission or non-codebook based uplink transmission.

In one embodiment, the transmission scheme of the second sub-signal is codebook based uplink transmission.

In one embodiment, the transmission scheme of the second sub-signal is Non-codebook based uplink transmission.

In one embodiment, the transmission scheme of the second sub-signal is codebook based uplink transmission or non-codebook based uplink transmission.

In one embodiment, the transmission scheme of the first sub-signal is the same as the transmission scheme of the second sub-signal.

In one embodiment, the transmission scheme of the first sub-signal and the transmission scheme of the second sub-signal are respectively configured by higher-layer parameters.

In one embodiment, for the codebook based uplink transmission, refer to chapter 6.1.1.1 in 3GPP TS38.214.

In one embodiment, for the non-codebook based uplink transmission, refer to chapter 6.1.1.2 in 3GPP TS38.214.

In one embodiment, the first signaling comprises a third field and a fourth field, where the third field comprised in the first signaling indicates the first reference signal resource group, and the fourth field comprised in the first signaling indicates the second reference signal resource group; the third field comprises at least one bit, and the fourth field comprises at least one bit.

In one embodiment, the third field is an SRS resource indicator field.

In one embodiment, the fourth field is an SRS resource indicator field.

In one embodiment, a name of the third field comprises an SRS, and a name of the fourth field comprises an SRS.

In one embodiment, any reference signal resource in the first reference signal resource group and the second reference signal resource group is an SRS (Sounding Reference Signal) resource.

In one embodiment, any reference signal resource in the first reference signal resource group and second reference signal resource group is a CSI-RS (Channel State Information Reference Signal) resource.

In one embodiment, the first reference signal resource group comprises at least one SRS resource in a first SRS resource set, and the second reference signal resource group comprises at least one SRS resource in a second SRS resource set; the first SRS resource set comprises multiple SRS resources, and the second SRS resource set comprises multiple SRS resources.

In one embodiment, the first reference signal resource group comprises at least one reference signal resource in a first reference signal resource set, and the second reference signal resource group comprises at least one reference signal resource in a second reference signal resource set; the first reference signal resource set comprises multiple reference signal resources, and the second reference signal resource set comprises multiple reference signal resources.

In one subembodiment of the above embodiment, the first reference signal resource set and the second reference signal resource set are indicated by a higher-layer signaling.

In one subembodiment of the above embodiment, the first reference signal resource set and the second reference signal resource set are indicated by srs-ResourceSetToAddModList parameters.

In one subembodiment of the above embodiment, the first reference signal resource set and the second reference signal resource set are indicated by IE SRS-Config.

In one subembodiment of the above embodiment, any reference signal resource in the first reference signal resource set is an SRS resource or a CSI-RS resource, and any reference signal resource in the second reference signal resource set is an SRS resource or a CSI-RS resource.

In one subembodiment of the above embodiment, any reference signal resource in the first reference signal resource set is an SRS resource, and any reference signal resource in the second reference signal resource set is an SRS resource.

In one subembodiment of the above embodiment, the transmission scheme of the first sub-signal is codebook based uplink transmission, and the first reference signal resource group comprises only one reference signal resource.

In one subembodiment of the above embodiment, the transmission scheme of the second sub-signal is codebook based uplink transmission, and the second reference signal resource group comprises only one reference signal resource.

In one subembodiment of the above embodiment, the transmission scheme of the first sub-signal is codebook based uplink transmission, and the first reference signal resource group comprises only one reference signal resource in the first reference signal resource set.

In one subembodiment of the above embodiment, the transmission scheme of the second sub-signal is codebook based uplink transmission, and the second reference signal resource group comprises only one reference signal resource in the second reference signal resource set.

In one subembodiment of the above embodiment, the transmission scheme of the first sub-signal is non-codebook based uplink transmission, and a number of reference signal resources comprised in the first reference signal resource group is equal to a number of layer(s) of the first sub-signal.

In one subembodiment of the above embodiment, the transmission scheme of the second sub-signal is non-codebook based uplink transmission, and a number of reference signal resources comprised in the second reference signal resource group is equal to a number of layer(s) of the second sub-signal.

In one embodiment, the meaning of the phrase that "the first reference signal resource group is used to determine antenna port(s) for transmitting the first sub-signal" comprises: antenna port(s) for transmitting the first sub-signal is the same as antenna port(s) for transmitting the first reference signal resource group; the meaning of the phrase that "the second reference signal resource group is used to determine antenna port(s) for transmitting the second sub-signal" comprises: antenna port(s) for transmitting the second sub-signal is(are) the same as antenna port(s) for transmitting the second reference signal resource group.

In one embodiment, the meaning of the phrase that "the first reference signal resource group is used to determine antenna port(s) for transmitting the first sub-signal" comprises: the first node adopts antenna port(s) same as antenna port(s) of the first reference signal resource group to transmit the first sub-signal; the meaning of the phrase that "the second reference signal resource group is used to determine antenna port(s) for transmitting the second sub-signal" comprises: the first node adopts antenna port(s) same as antenna port(s) of the second reference signal resource group to transmit the second sub-signal.

In one embodiment, the meaning of the phrase that "the first reference signal resource group is used to determine antenna port(s) for transmitting the first sub-signal" comprises: a number of antenna port(s) for transmitting the first sub-signal is the same as a number of antenna port(s) for the first reference signal resource group; the meaning of the phrase that "the second reference signal resource group is used to determine antenna port(s) for transmitting the second sub-signal" comprises: a number of antenna port(s) for transmitting the second sub-signal is the same as a number of antenna port(s) of the second reference signal resource group.

In one embodiment, the meaning of the phrase that "the first reference signal resource group is used to determine antenna port(s) for transmitting the first sub-signal" comprises: antenna port(s) for transmitting the first sub-signal and antenna port(s) of the first reference signal resource group have a same spatial relation; the meaning of the phrase that "the second reference signal resource group is used to determine antenna port(s) for transmitting the second sub-signal" comprises: antenna port(s) for transmitting the second sub-signal and antenna port(s) of the second reference signal resource group have a same spatial relation.

In one embodiment, the meaning of the phrase that "the first reference signal resource group is used to determine antenna port(s) for transmitting the first sub-signal" comprises: antenna port(s) for transmitting the first sub-signal and antenna port(s) of the first reference signal resource group have a same spatial relation; the meaning of the phrase that "the second reference signal resource group is used to determine antenna port(s) for transmitting the second sub-signal" comprises: antenna port(s) for transmitting the second sub-signal and antenna port(s) of the second reference signal resource group have a same spatial relation.

In one embodiment, the spatial relation comprises: Spatial Tx parameters.

In one embodiment, the spatial relation comprises: spatial domain transmission filter.

In one embodiment, the spatial relation comprises: precoding.

In one embodiment, the spatial relation comprises: beamforming.

In one embodiment, time-frequency resources respectively occupied by the P reference signals are orthogonal.

Typically, the phrase of "occupied time-frequency resources" refers to: all REs occupied.

In one embodiment, the target reference signal group is a reference signal used for phase tracking.

In one embodiment, the target reference signal group is a PTRS (Phase Tracking Reference Signal).

In one embodiment, the target reference signal group is a PTRS with a number of antenna ports of P.

Typically, the P reference signals are respectively reference signals on the P antenna ports in the target reference signal group.

Typically, the first factor is a positive real number.

Typically, the first factor is measured by dB.

Typically, the first factor is equal to a logarithm of a linear value of the first factor at a base of 10, then multiplied by 10.

Typically, a linear value of the first factor is c, and the first factor is 10 $\log_{10}$ c.

Typically, the first factor is α, and a linear value of the first factor is $$10^{\frac{\alpha}{10}}.$$

In one embodiment, the first factor is $$\alpha_{PTRS}^{PUSCH}.$$

In one embodiment, for the specific meaning of the $$\alpha_{PTRS}^{PUSCH},$$

refer to chapter 6 in 3GPP TS38.214.

In one embodiment, P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; the first factor is related to at least one of P1, P2, or P.

In one embodiment, P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; the first factor is related to P1 and P2.

In one embodiment, the first factor is at least functionally related to P1 and P2.

In one embodiment, the first factor is at least a mapping relation with P1 and P2.

In one embodiment, the first node obtains the first factor by looking up a table according to at least P1 and P2.

In one embodiment, when the first antenna port is associated with the first reference signal resource group, the first factor is at least a functional relation with a number of layer(s) of the first sub-signal, P1, and P2; when the first antenna port is associated with the second reference signal resource group, the first factor is at least a functional relation with a number of layer(s) of the second sub-signal, P1, and P2.

In one embodiment, when the first antenna port is associated with the first reference signal resource group, the first factor is at least a mapping relation with a number of layer(s) of the first sub-signal, P1, and P2; when the first antenna port is associated with the second reference signal resource group, the first factor is at least a mapping relation with a number of layer(s) of the second sub-signal, P1, and P2.

In one embodiment, when the first antenna port is associated with the first reference signal resource group, the first node obtains the first factor by looking up a table based on at least a number of layer(s) of the first sub-signal, P1, and P2; when the first antenna port is associated with the second reference signal resource group, the first node obtains the first factor by looking up a table according to at least a number of layer(s) of the second sub-signal, P1, and P2.

In one embodiment, the first factor is equal to a sum of a second factor and a third factor; the third factor is related to the P1 and the P2; when the first antenna port is associated with the first reference signal resource group, the second factor is related to the number of layer(s) of the first sub-signal; when the first antenna port is associated with the second reference signal resource group, the second factor is related to the number of layer(s) of the second sub-signal.

In one embodiment, when the first antenna port is associated with the first reference signal resource group, a number of layer(s) of the first sub-signal is equal to 1, P1 is equal to 1 and P2 is equal to 1, the first factor is equal to 3.

In one embodiment, when the first antenna port is associated with the second reference signal resource group, a number of layer(s) of the second sub-signal is equal to 1, P1 is equal to 1 and P2 is equal to 1, the first factor is equal to 3.

In one embodiment, when the first antenna port is associated with the first reference signal resource group, a number of layer(s) of the first sub-signal is equal to 1, P1 is equal to 2 and P2 is equal to 1, the first factor is equal to 1.76.

In one embodiment, when the first antenna port is associated with the second reference signal resource group, a number of layer(s) of the second sub-signal is equal to 1, P1 is equal to 2 and P2 is equal to 1, the first factor is equal to 4.77.

In one embodiment, when the first antenna port is associated with the first reference signal resource group, a number of layer(s) of the first sub-signal is equal to 1, P1 is equal to 1 and P2 is equal to 2, the first factor is equal to 4.77.

In one embodiment, when the first antenna port is associated with the second reference signal resource group, a number of layer(s) of the second sub-signal is equal to 1, P1 is equal to 1 and P2 is equal to 2, the first factor is equal to 1.76.

In one embodiment, when the first antenna port is associated with the first reference signal resource group, a number of layer(s) of the first sub-signal is equal to 1, P1 is equal to 2 and P2 is equal to 2, the first factor is equal to 3.

In one embodiment, when the first antenna port is associated with the second reference signal resource group, a number of layer(s) of the second sub-signal is equal to 1, P1 is equal to 2 and P2 is equal to 2, the first factor is equal to 3.

In one embodiment, when the first antenna port is associated with the first reference signal resource group, a number of layer(s) of the first sub-signal is equal to 2, P1 is equal to 1 and P2 is equal to 1, the first factor is equal to 6.

In one embodiment, when the first antenna port is associated with the second reference signal resource group, a number of layer(s) of the second sub-signal is equal to 2, P1 is equal to 1 and P2 is equal to 1, the first factor is equal to 6.

In one embodiment, when the first antenna port is associated with the first reference signal resource group, a number of layer(s) of the first sub-signal is equal to 2, P1 is equal to 2 and P2 is equal to 1, the first factor is equal to 4.76.

In one embodiment, when the first antenna port is associated with the second reference signal resource group, a number of layer(s) of the second sub-signal is equal to 2, P1 is equal to 2 and P2 is equal to 1, the first factor is equal to 7.77.

In one embodiment, when the first antenna port is associated with the first reference signal resource group, a number of layer(s) of the first sub-signal is equal to 2, P1 is equal to 1 and P2 is equal to 2, the first factor is equal to 7.77.

In one embodiment, when the first antenna port is associated with the second reference signal resource group, a number of layer(s) of the second sub-signal is equal to 2, P1 is equal to 1 and P2 is equal to 2, the first factor is equal to 4.76.

In one embodiment, when the first antenna port is associated with the first reference signal resource group, a number of layer(s) of the first sub-signal is equal to 2, P1 is equal to 2 and P2 is equal to 2, the first factor is equal to 6.

In one embodiment, when the first antenna port is associated with the second reference signal resource group, a number of layer(s) of the second sub-signal is equal to 2, P1 is equal to 2 and P2 is equal to 2, the first factor is equal to 6.

Typically, the transmit power of the first reference signal on the first RE is measured by mW (milliwatt).

In one embodiment, the transmit power of the first reference signal on the first RE is equal to a product of reference power and a linear value of the first factor.

In one embodiment, the reference power is transmit power per layer per RE of PUSCH.

In one embodiment, the reference power is transmit power per RE per antenna port of DMRS (DeModulation Reference Signals).

In one embodiment, the reference power is predefined or configurable.

Typically, any of the P antenna ports is associated with the first reference signal resource group or the second reference signal resource group.

In one embodiment, the phrase that "the first antenna port is associated with the first reference signal resource group" comprises: the first antenna port is associated with an antenna port of the first demodulation reference signal; the phrase that "the first antenna port is associated with the second reference signal resource group" comprises: the first antenna port is associated with an antenna port of the second demodulation reference signal.

In one embodiment, the meaning of the phrase that "the first antenna port is associated with the first reference signal resource group" comprises: antenna port(s) of the first reference signal resource group is(are) used to transmit the first reference signal; the meaning of the phrase that "the first antenna port is associated with the second reference signal resource group" comprises: antenna port(s) of the second reference signal resource group is(are) used to transmit the first reference signal.

In one embodiment, the meaning of the phrase that "the first antenna port is associated with the first reference signal resource group" comprises: antenna port(s) of the first reference signal through precoding belongs(belong) to antenna port(s) of the first reference signal resource group; the meaning of the phrase that "the first antenna port is associated with the second reference signal resource group" comprises: antenna port(s) of the first reference signal through precoding belongs(belong) to antenna port(s) of the second reference signal resource group.

In one embodiment, the meaning of the phrase that "the first antenna port is associated with the first reference signal resource group" comprises: antenna port(s) of the first reference signal through precoding is(are) the same as antenna port(s) of the first reference signal resource group; the meaning of the phrase that "the first antenna port is associated with the second reference signal resource group" comprises: antenna port(s) of the first reference signal through precoding is(are) the same as antenna port(s) of the second reference signal resource group.

In one embodiment, the meaning of the phrase that "the first antenna port is associated with the first reference signal resource group" comprises: configuration information of a reference signal resource in the first reference signal resource group comprises the first antenna port; the meaning of the phrase that "the first antenna port is associated with the second reference signal resource group" comprises: configuration information of a reference signal resource in the second reference signal resource group comprises the first antenna port.

In one embodiment, the meaning of the phrase that "the first antenna port is associated with the first reference signal resource group" comprises: the first reference signal resource group is used to determine antenna port(s) of the first reference signal through precoding; the meaning of the phrase that "the first antenna port is associated with the second reference signal resource group" comprises: the second reference signal resource group is used to determine antenna port(s) of the first reference signal through precoding.

In one embodiment, the meaning of the phrase that "the first antenna port is associated with the first reference signal resource group" comprises: the first reference signal resource group is used to determine antenna port(s) for transmitting the first sub-signal, and antenna port(s) of the first reference signal through precoding belongs(belong) to antenna port(s) of the first sub-signal; the meaning of the phrase that "the first antenna port is associated with the second reference signal resource group" comprises: the second reference signal resource group is used to determine antenna port(s) for transmitting the second sub-signal, and antenna port(s) of the first reference signal through precoding belongs(belong) to antenna port(s) of the second sub-signal;

In one embodiment, the meaning of the phrase that "the first antenna port is associated with the first reference signal resource group" comprises: antenna port(s) of the first reference signal through precoding and antenna port(s) of the first reference signal resource group have a same spatial relation; the meaning of the phrase that "the first antenna port is associated with the second reference signal resource group" comprises: antenna port(s) of the first reference signal through precoding and antenna port(s) of the second reference signal resource group have a same spatial relation.

In one embodiment, the first antenna port is $\tilde{p}_j$, where j is a non-negative integer; antenna port(s) of the first reference signal through precoding is $p_0, p_1, \ldots, p_{\rho-1}$, where ρ is a non-negative integer.

Typically, for specific meanings of the $\tilde{p}_j$ and the $p_0, p_1, \ldots, p_{\rho-1}$, refer to chapter 6 in 3GPP TS38.211.

In one embodiment, the first factor is related to a number of layer(s) of the given sub-signal, the first factor is also related to a transmission scheme of the given sub-signal, and the given sub-signal is either the first sub-signal or the second sub-signal.

In one subembodiment of the above embodiment, the first factor is at least a functional relation with a transmission scheme of the given sub-signal.

In one subembodiment of the above embodiment, the first factor is at least a mapping relation with a transmission scheme of the given sub-signal.

In one subembodiment of the above embodiment, the first node obtains the second factor by looking up a table according to the transmission scheme of at least the given sub-signal.

In one embodiment, the codebook based uplink transmission comprises fully coherent codebook based uplink transmission, partial-coherent codebook based uplink transmission, and non-coherent codebook based uplink transmission.

In one embodiment, for specific meanings of full coherent codebook based uplink transmission, partial-coherent codebook based uplink transmission, and non-coherent codebook based uplink transmission, refer to chapter 6 of 3GPP TS38.214.

In one embodiment, the meaning of the phrase that "the first factor is related to a number of layer(s) of a given sub-signal" comprises: the first factor is at least a functional relation with a number of layer(s) of the given sub-signal.

In one embodiment, the meaning of the phrase that "the first factor is related to a number of layer(s) of a given sub-signal" comprises: the first factor is at least a mapping relation with a number of layer(s) of the given sub-signal.

In one embodiment, the meaning of the phrase that "the first factor is related to a number of layer(s) of a given sub-signal" comprises: the first node obtains the first factor by looking up a table according to at least a number of layer(s) of the given sub-signal.

In one embodiment, the meaning of the phrase that "the first factor is related to a number of layer(s) of a given sub-signal" comprises: the first factor is equal to a dB value of a number of layer(s) of the given sub-signal.

In one subembodiment of the above embodiment, the transmission scheme of the given sub-signal is full coherent codebook based uplink transmission.

In one embodiment, the meaning of the phrase that "the first factor is related to a number of layer(s) of a given sub-signal" comprises: when a number of layer(s) of the given sub-signal is equal to 1, 2, 3, respectively, and 4, and the first factor is equal to 0, 3, 4.77, and 6, respectively.

In one embodiment, the meaning of the phrase that "the first factor is related to a number of layer(s) of a given sub-signal" comprises: the transmission scheme of the given sub-signal is full coherent codebook based uplink transmission; when a number of layer(s) of the given sub-signal is equal to 1, 2, 3, and 4, respectively, and the first factor is equal to 0, 3, 4.77, and 6, respectively.

In one embodiment, the meaning of the phrase that "the first factor is related to a number of layer(s) of a given sub-signal" comprises: the transmission scheme of the given sub-signal is partial coherent codebook based uplink transmission; when a number of layer(s) of the given sub-signal is equal to 1, 2, 3, and 4, respectively, and the first factor is equal to 0, $3Q_p-3$, $3Q_p-3$ and $3Q_p$, respectively.

In one embodiment, the meaning of the phrase that "the first factor is related to a number of layer(s) of a given sub-signal" comprises: a transmission scheme of the given sub-signal is either non-coherent codebook based uplink transmission or non-codebook based uplink transmission; when a number of layer(s) of the given sub-signal is equal to 1, 2, 3, and 4, respectively, the first factor is equal to 0, $3Q_p-3$, $3Q_p-3$ and $3Q_p-3$, respectively.

In one embodiment, the meaning of the phrase that "the first factor is related to a number of layer(s) of a given sub-signal" comprises: the first factor is linearly correlated with a dB value of a number of layer(s) of the given sub-signal.

In one subembodiment of the above embodiment, the transmission scheme of the given sub-signal is full coherent codebook based uplink transmission.

In one embodiment, the meaning of the phrase that "the first factor is related to a number of layer(s) of a given sub-signal" comprises: the first factor and second factor are linearly correlated, and the second factor is related to a number of layer(s) of the given sub-signal.

In one embodiment, the meaning of the phrase that "the first factor is related to a number of layer(s) of a given sub-signal" comprises: the first factor is equal to a sum of a second factor and a third factor, and only the second factor in the second factor and the third factor is related to a number of layer(s) of the given sub-signal.

In one embodiment, the meaning of the phrase that "the first factor is related to a number of layer(s) of a given sub-signal" comprises: the first factor is equal to a sum of a second factor and a third factor, and the second factor is equal to a dB value of a number of layer(s) of the given sub-signal.

In one subembodiment of the above embodiment, the transmission scheme of the given sub-signal is full coherent codebook based uplink transmission.

In one embodiment, the given sub-signal is either the first sub-signal or the second sub-signal.

Typically, a dB value of a number of layer(s) of the first sub-signal is equal to a logarithm of a number of layer(s) of the first sub-signal at a base of 10 then multiplied by 10.

Typically, a number of layer(s) of the first sub-signal is $\sigma$, and a dB value of a number of layer(s) of the first sub-signal is $10 \log_{10} \sigma$.

Embodiment 2

Figure 2:
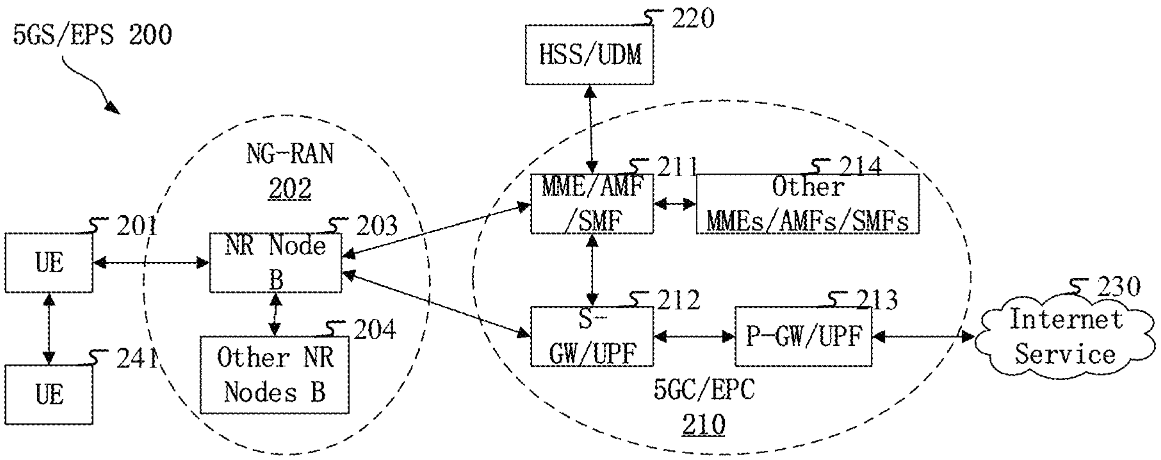
FIG. 2 illustrates a schematic diagram of a network architecture according to one embodiment of the present application.

Embodiment 2 illustrates a schematic diagram of a network architecture according to one embodiment of the present application, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G systems network architecture 200 may be called an Evolved Packet System (EPS) 200. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in Sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Services.

In one embodiment, the first node in the present application comprises the UE 201.

In one embodiment, the second node in the present application comprises the gNB 203.

Embodiment 3

Figure 3:
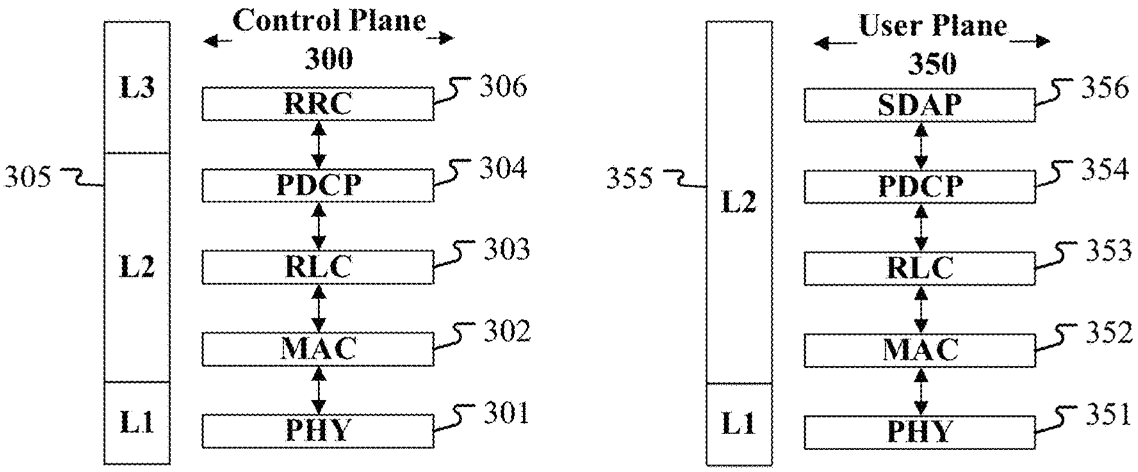
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to one embodiment of the present application, as shown in FIG. 3.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first communication node and a second communication node, or between two UEs. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling is generated by the PHY 301 or the PHY 351.

In one embodiment, the target signal is generated by the PHY 301 or the PHY 351.

In one embodiment, the target reference signal group is generated at the PHY 301 or the PHY 351.

In one embodiment, the first demodulation reference signal and the second demodulation reference signal are generated by the PHY 301, or the PHY 351.

Embodiment 4

Figure 4:
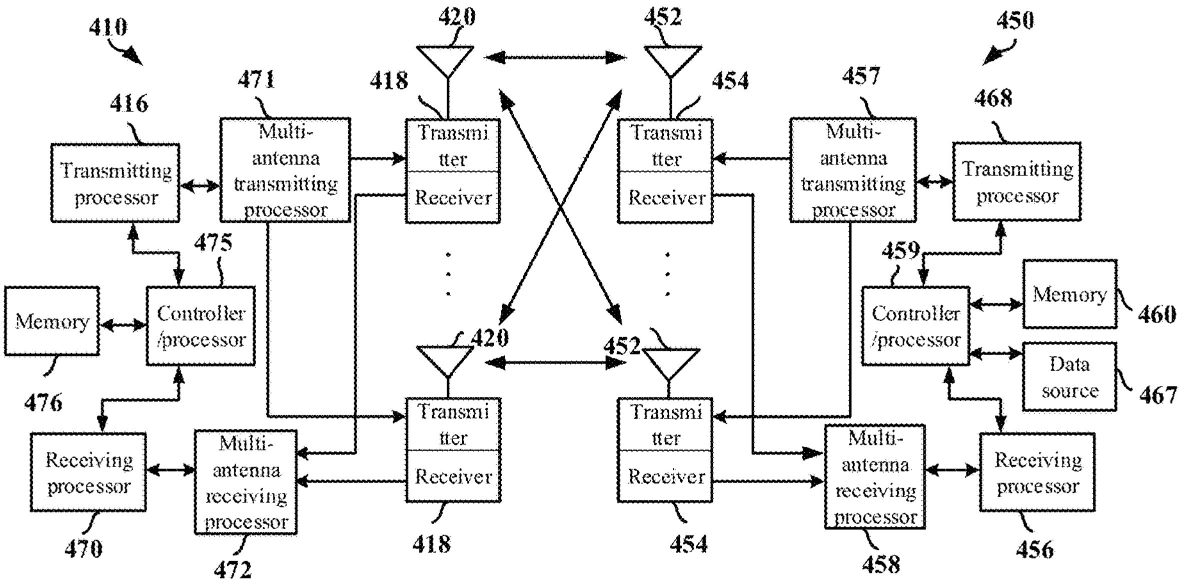
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink (DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated parallel streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first signaling, the first signaling is used to indicate a target time-frequency resource block; transmits a target signal and a target reference signal group in the target time-frequency resource block; herein, the target time-frequency resource block comprises multiple REs; the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, and the P reference signals are respectively transmitted by P antenna ports, P being a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

In one embodiment, the second communication device 450 comprises a memory that stores a computer readable instruction program. The computer readable instruction program generates an action when executed by at least one processor. The action includes: receiving a first signaling, the first signaling being used to indicate a target time-frequency resource block; transmitting a target signal and a target reference signal group in the target time-frequency resource block; herein, the target time-frequency resource block comprises multiple REs; the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, and the P reference signals are respectively transmitted by P antenna ports, P being a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first signaling, the first signaling is used to indicate a target time-frequency resource block; receives a target signal and a target reference signal group in the target time-frequency resource block; herein, the target time-frequency resource block comprises multiple REs; the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, and the P reference signals are respectively transmitted by P antenna ports, P being a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

In one embodiment, the first communication device 410 comprises a memory that stores a computer readable instruction program. The computer readable instruction program generates an action when executed by at least one processor. The action includes: transmitting a first signaling, the first signaling being used to indicate a target time-frequency resource block; receiving a target signal and a target reference signal group in the target time-frequency resource block; herein, the target time-frequency resource block comprises multiple REs; the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, and the P reference signals are respectively transmitted by P antenna ports, P being a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

In one embodiment, the first node comprises the second communication device 450 in the present application.

In one embodiment, the second node in the present application comprises the first communication device 410.

In one embodiment, at least one of the antenna 452, the receiver 454, the receiving processor 456, the multi-antenna receiving processor 458, the controller/processor 459, the memory 460, or the data source 467 is used to receive the first signaling in the present application; at least one of the antenna 420, the transmitter 418, the transmitting processor 416, the multi-antenna transmitting processor 471, the controller/processor 475, or the memory 476 is used to transmit the first signaling in the present application.

In one embodiment, at least one of the antenna 452, the transmitter 454, the transmitting processor 468, the multi-antenna transmitting processor 457, the controller/processor 459, or the memory 460 is used to transmit the target signal and the target reference signal group in the target time-frequency resource block in the present application; at least one of the antenna 420, the receiver 418, the receiving processor 470, the multi-antenna receiving processor 472, the controller/processor 475, or the memory 476 is used to receive the target signal and the target reference signal group in the target time-frequency resource block in the present application.

In one embodiment, at least one of the antenna 452, the transmitter 454, the transmitting processor 468, the multi-antenna transmitting processor 457, the controller/processor 459, or the memory 460 is used to transmit the first demodulation reference signal and the second demodulation reference signal in the target time-frequency resource block in the present application; at least one of the antenna 420, the receiver 418, the receiving processor 470, the multi-antenna receiving processor 472, the controller/processor 475, or the memory 476 is used to receive the first demodulation reference signal and the second demodulation reference signal in the target time-frequency resource block in the present application.

Embodiment 5

Figure 5:
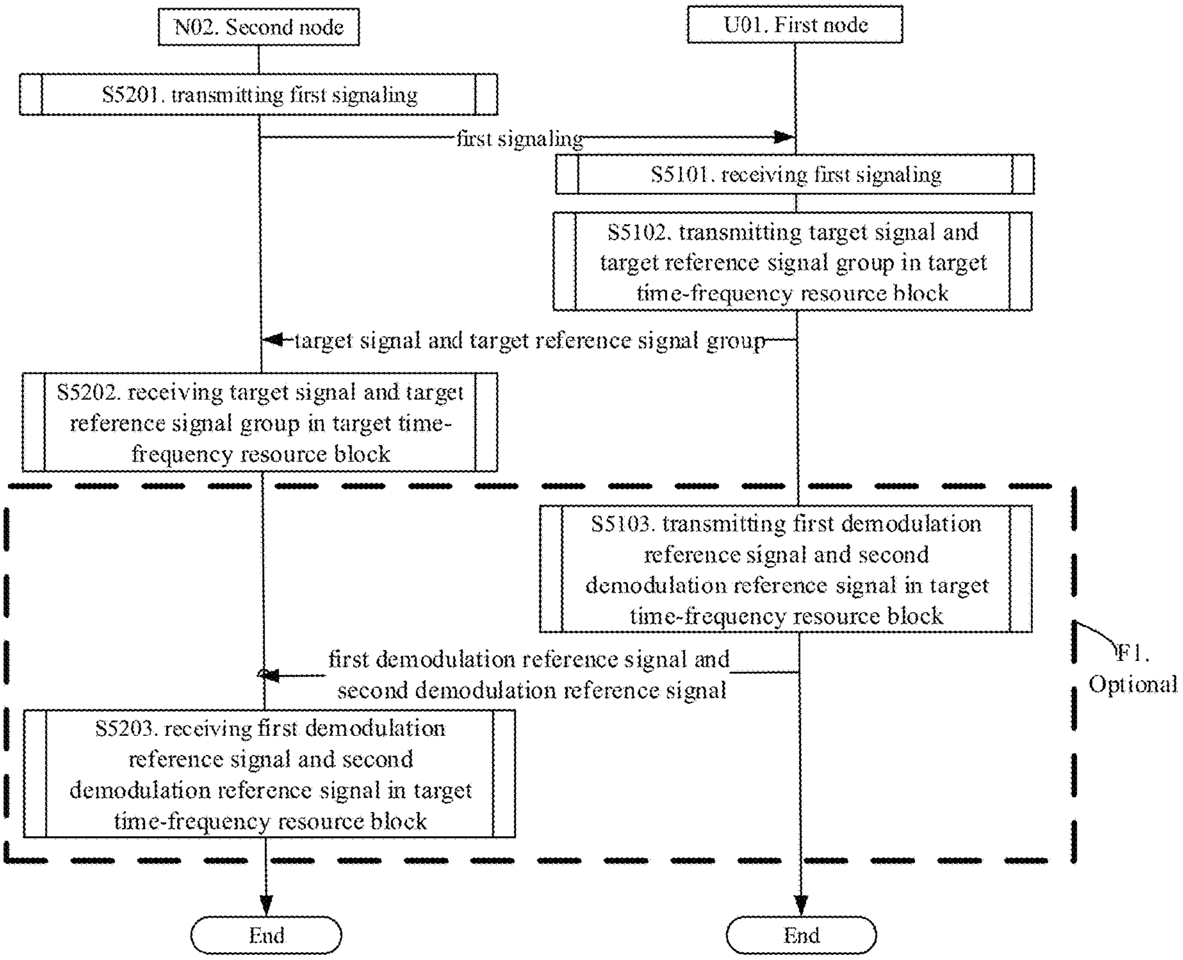
FIG. 5 illustrates a flowchart of wireless communications according to one embodiment of the present application.

Embodiment 5 illustrates a flowchart of wireless transmission according to one embodiment in the present application, as shown in FIG. 5. In FIG. 5, a first node U01 and a second node N02 are respectively two communication nodes transmitted via an air interface; in FIG. 5, steps in box F1 are optional.

The first node U01 receives a first signaling in step S5101; transmit a target signal and a target reference signal group in a target time-frequency resource block in step S5102; transmits a first demodulation reference signal and a second demodulation reference signal in a target time-frequency resource block in step S5103;

The second node N02 transmits a first signaling in step S5201; receives a target signal and a target reference signal group in a target time-frequency resource block in step S5202; receives a first demodulation reference signal and a second demodulation reference signal in a target time-frequency resource block in step S5203.

In embodiment 5, the first signaling is used to indicate a target time-frequency resource block; the target time-frequency resource block comprises multiple REs; the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises Preference signals, and the Preference signals are respectively transmitted by P antenna ports, P being a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

In one embodiment, the first reference signal resource group is used by the first node U01 to determine antenna port(s) for transmitting the first sub-signal, and the second reference signal resource group is used by the first node U01 to determine antenna port(s) for transmitting the second sub-signal.

In one embodiment, the first reference signal resource group is used by the second node N02 to determine antenna port(s) for transmitting the first sub-signal, and the second reference signal resource group is used by the second node N02 to determine antenna port(s) for transmitting the second sub-signal.

In one embodiment, measurements for the first demodulation reference signal and the second demodulation reference signal are used for a demodulation of the target signal.

In one embodiment, a channel estimated from measurements for the first demodulation reference signal and the second demodulation reference signal is used for a demodulation of the target signal.

In one embodiment, a measurement for the first demodulation reference signal is used for a demodulation of the first sub-signal, and a measurement for the second demodulation reference signal is used for a demodulation of the second sub-signal.

In one embodiment, a channel estimated by a measurement for the first demodulation reference signal is used for a demodulation of the first sub-signal, and a channel estimated by a measurement for the second demodulation reference signal is used for a demodulation of the second sub-signal.

In one embodiment, the first demodulation reference signal comprises partial DMRSs (Demodulation Reference Signals) of the target signal, and the second demodulation reference signal comprises partial DMRS of the target signal.

In one embodiment, a DMRS (Demodulation Reference Signals) of the target signal comprises the first demodulation reference signal and the second demodulation reference signal.

In one embodiment, the first demodulation reference signal comprises DMRS of the first sub-signal, and the second demodulation reference signal comprises DMRS of the second sub-signal.

In one embodiment, the first reference signal resource group is used to determine antenna port(s) of the first demodulation reference signal through precoding, and the second reference signal resource group is used to determine antenna port(s) of the second demodulation reference signal through precoding.

In one embodiment, the first reference signal resource group is used by the first node U01 to determine antenna port(s) of the first demodulation reference signal through precoding, and the second reference signal resource group is used by the first node U01 to determine antenna port(s) of the second demodulation reference signal through precoding.

In one embodiment, the first reference signal resource group is used by the second node N02 to determine antenna port(s) of the first demodulation reference signal through precoding, and the second reference signal resource group is used by the second node N02 to determine antenna port(s) of the second demodulation reference signal through precoding.

In one embodiment, antenna port(s) of the first reference signal resource group is(are) used to transmit the first demodulation reference signal, and antenna port(s) of the second reference signal resource group is(are) used to transmit the second demodulation reference signal.

In one embodiment, the antenna port(s) for transmitting the first sub-signal is(are) the same as antenna port(s) of the first demodulation reference signal through precoding, and the antenna port for transmitting the second sub-signal is the same as antenna port(s) of the second demodulation reference signal through precoding.

In one embodiment, the antenna port(s) for transmitting the first sub-signal is(are) used to transmit the first demodulation reference signal, and the antenna port(s) for transmitting the second sub-signal is(are) used to transmit the second demodulation reference signal.

In one embodiment, the first signaling indicates that the first antenna port is associated with an antenna port of the first demodulation reference signal or the second demodulation reference signal.

In one embodiment, the first signaling indicates that the first antenna port is associated with which antenna port of the first demodulation reference signal or the second demodulation reference signal.

In one embodiment, the first signaling comprises a fifth field, where the fifth field comprised in the first signaling indicates that the first antenna port is associated with an antenna port of the first demodulation reference signal or the second demodulation reference signal; the fifth field comprises at least one bit.

In one embodiment, the first signaling comprises a fifth field, where the fifth field comprised in the first signaling indicates that the first antenna port is associated with which antenna port of the first demodulation reference signal or the second demodulation reference signal; the fifth field comprises at least one bit.

In one embodiment, the fifth field is a PTRS-DMRS association field.

In one embodiment, for the specific meaning of the PTRS-DMRS association field, refer to chapter 7.3 in 3GPP TS38.212.

In one embodiment, the meaning of the phrase that "the first antenna port is associated with an antenna port of the first demodulation reference signal" comprises: frequency-domain resources occupied by the first reference signal belong to frequency-domain resources occupied by an antenna port of the first demodulation reference signal; the meaning of the phrase that "the first antenna port is associated with an antenna port of the second demodulation reference signal" comprises: frequency-domain resources occupied by the first reference signal belong to frequency-domain resources occupied by an antenna port of the second demodulation reference signal.

In one embodiment, the meaning of the phrase that "the first antenna port is associated with an antenna port of the first demodulation reference signal" comprises: a subcarrier occupied by the first reference signal belongs to a subcarrier occupied by an antenna port of the first demodulation reference signal; the meaning of the phrase that "the first antenna port is associated with an antenna port of the second demodulation reference signal" comprises: a subcarrier occupied by the first reference signal belongs to a subcarrier occupied by an antenna port of the second demodulation reference signal.

In one embodiment, the meaning of the phrase that "the first antenna port is associated with an antenna port of the first demodulation reference signal" comprises: the first antenna port is used for compensating phase noise of the first demodulation reference signal; the meaning of the phrase that "the first antenna port is associated with an antenna port of the second demodulation reference signal" comprises: the first antenna port is used for compensating phase noise of the second demodulation reference signal.

In one embodiment, the meaning of the phrase that "the first antenna port is associated with an antenna port of the first demodulation reference signal" comprises: the first antenna port is used for compensating phase noise of the first sub-signal; the meaning of the phrase that "the first antenna port is associated with an antenna port of the second demodulation reference signal" comprises: the first antenna port is used to compensate for phase noise of the second sub-signal.

In one embodiment, the meaning of the phrase that "the first antenna port is associated with an antenna port of the first demodulation reference signal" comprises: antenna port(s) of the first reference signal through precoding is the same as antenna port(s) of the first demodulation reference signal through precoding; the meaning of the phrase that "the first antenna port is associated with an antenna port of the second demodulation reference signal" comprises: antenna port(s) of the first reference signal through precoding is the same as antenna port(s) of the second demodulation reference signal through precoding.

In one embodiment, the meaning of the phrase that "the first antenna port is associated with an antenna port of the first demodulation reference signal" comprises: the first reference signal and the first demodulation reference signal have same precoding; the meaning of the phrase that "the first antenna port is associated with an antenna port of the second demodulation reference signal" comprises: the first reference signal and the second demodulation reference signal have same precoding.

In one embodiment, the meaning of the phrase that "the first antenna port is associated with an antenna port of the first demodulation reference signal" comprises: small-scale channel fading parameters to which an antenna port of the first demodulation reference signal is conveyed can be used to infer small-scale channel fading parameters to which an the first antenna port is conveyed; the meaning of the phrase that "the first antenna port is associated with an antenna port of the second demodulation reference signal" comprises: small-scale channel fading parameters to which an antenna port of the second demodulation reference signal is conveyed can be used to infer small-scale channel fading parameters to which the first antenna port is conveyed.

Embodiment 6

Figure 6:
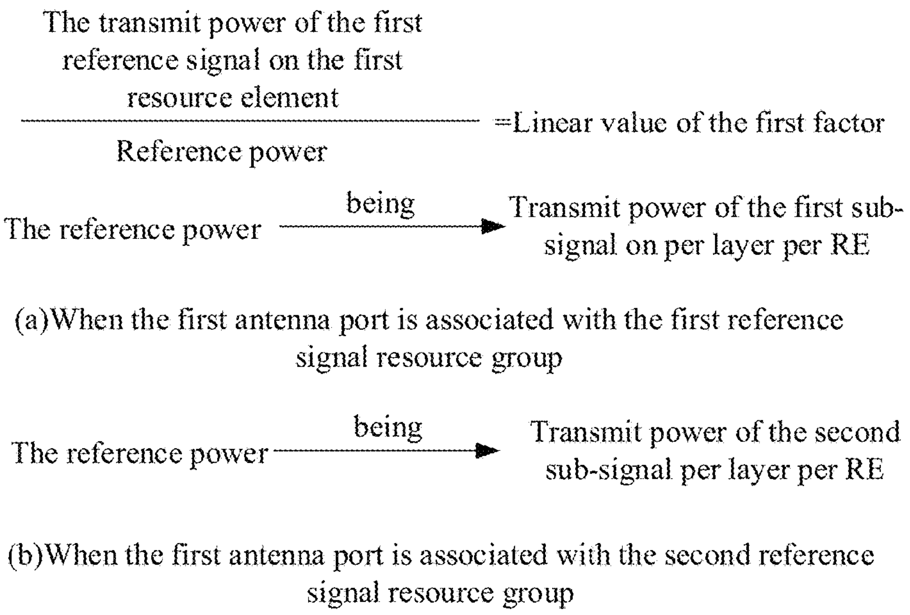
FIG. 6 illustrate a schematic diagram of relations of transmit power of a first reference signal on a first RE and a first factor according to one embodiment of the present application.

Embodiment 6 illustrate a schematic diagram of relations of transmit power of a first reference signal on a first RE and a first factor according to one embodiment of the present application, as shown in FIG. 6.

In embodiment 6, a ratio of the transmit power of the first reference signal on the first RE to a reference power is equal to the linear value of the first factor; the reference power is related to whether the first antenna port is associated with the first reference signal resource group or is associated with the second reference signal resource group; when the first antenna port is associated with the first reference signal resource group, the reference power is transmit power of the first sub-signal per layer per RE; when the first antenna port is associated with the second reference signal resource group, the reference power is transmit power of the second sub-signal per layer per RE.

Typically, the transmit power of the first reference signal on the first RE and the reference power are measured by mW (milliwatt).

Typically, "a ratio of the transmit power on the first RE to reference power" is a value obtained by dividing the transmit power on the first RE by reference power.

In one embodiment, "transmit power of the first sub-signal per layer per RE" is equal to total transmit power of the first sub-signal divided by a number of layer(s) of the first sub-signal and then divided by a number of RE(s) occupied; "transmit power of the second sub-signal per layer per RE" is equal to a value obtained after total transmit power of the second sub-signal divided by a number of layer(s) of the second sub-signal and then divided by a number of RE(s) occupied.

In one embodiment, "transmit power of the first sub-signal per layer per RE" is equal to a value obtained by dividing transmit power of the first sub-signal on each RE by a number of layer(s) of the first sub-signal; "transmit power of the second sub-signal per layer per RE" is equal to a value obtained by dividing transmit power of the second sub-signal on each RE by a number of layer(s) of the second sub-signal.

Embodiment 7

Embodiment 7 illustrates a schematic diagram of a first factor according to one embodiment of the present application, as shown in FIG. 7.

In embodiment 7, P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; when the first antenna port is associated with the first reference signal resource group, the first factor is also related to the P and the P1; when the first antenna port is associated with the second reference signal resource group, the first factor is also related to the P and the P2.

In one embodiment, the P reference signals occupy same time-domain resources.

In one embodiment, the meaning of the phrase that "the first factor is also related to P and P1" comprises: the first factor is at least a functional relation with P and P1; the meaning of the phrase that "the first factor is also related to the P and the P2" comprises: the first factor is at least a functional relation with P and P2.

In one embodiment, the meaning of the phrase that "the first factor is also related to P and P1" comprises: the first factor is at least a mapping relation with P and P1; the meaning of the phrase that "the first factor is also related to the P and the P2" comprises: the first factor is at least a mapping relation with P and P2.

In one embodiment, the meaning of the phrase that "the first factor is also related to P and P1" comprises: the first node obtains the first factor by looking up a table according to at least P and P1; the meaning of the phrase that "the first factor is also related to the P and the P2" comprises: the first node obtains the first factor by looking up a table according to at least P and P2.

In one embodiment, the meaning of the phrase that "the first factor is also related to P and P1" comprises: the first factor is also related to a ratio of P to P1; the meaning of the phrase that "the first factor is also related to the P and the P2" comprises: the first factor is also related to a ratio of P to P2.

In one embodiment, the meaning of the phrase that "the first factor is also related to P and P1" comprises: the first factor is linearly correlated with a ratio of P to P1; the meaning of the phrase that "the first factor is also related to the P and the P2" comprises: the first factor is linearly correlated with a ratio of P to P2.

In one embodiment, the meaning of the phrase that "the first factor is also related to P and P1" comprises: the first factor is equal to a sum of a second factor and a third factor, and the third factor is related to a ratio of P and P1; the meaning of the phrase that "the first factor is also related to the P and the P2" comprises: the first factor is equal to a sum of a second factor and a third factor, and the third factor is related to a ratio of the P to the P2.

In one embodiment, the meaning of the phrase that "the first factor is also related to a ratio of P to P1" comprises: the first factor is at least a functional relation with a ratio of P to P1; the meaning of the phrase that "the first factor is also related to a ratio of P to P2" comprises: the first factor is at least a functional relation with a ratio of P to P2.

In one embodiment, the meaning of the phrase that "the first factor is also related to a ratio of P to P1" comprises: the first factor is at least a mapping relation with a ratio of P to P1; the meaning of the phrase that "the first factor is also related to a ratio of P to P2" comprises: the first factor is at least a mapping relation with a ratio of P to P2.

In one embodiment, the meaning of the phrase that "the first factor is also related to a ratio of P to P1" comprises: the first node obtains the first factor by looking up a table according to at least a ratio of P and P1; the meaning of the phrase that "the first factor is also related to a ratio of P to P2" comprises: the first node obtains the first factor by looking up a table according to at least a ratio of P and P2.

Typically, a ratio of P to P1 is equal to a value obtained by dividing P by P1, and a ratio of P to P2 is equal to a value obtained by dividing P by P2.

Embodiment 8

Embodiment 8 illustrates a schematic diagram of a first factor according to another embodiment of the present application, as shown in FIG. 8.

In embodiment 8, the first factor is equal to a sum of a second factor and a third factor; when the first antenna port is associated with the first reference signal resource group, the second factor is related to the number of layer(s) of the first sub-signal, and the third factor is related to a ratio of the P to the P1; when the first antenna port is associated with the second reference signal resource group, the second factor is related to the number of layer(s) of the second sub-signal, and the third factor is related to a ratio of the P to the P2.

Typically, the second factor is a positive real number.

Typically, the second factor is measured by dB.

In one embodiment, the second factor is related to whether the first antenna port is associated with the first reference signal resource group or is associated with the second reference signal resource group.

In one embodiment, the meaning of the phrase that "the second factor is related to a number of layer(s) of the first sub-signal" comprises: a linear value of the second factor is equal to a number of layer(s) of the first sub-signal; the meaning of the phrase that "the second factor is related to a number of layer(s) of the second sub-signal" comprises: a linear value of the second factor is equal to a number of layer(s) of the second sub-signal.

In one embodiment, the second factor is related to a number of layer(s) of the given sub-signal, the second factor is also related to a transmission scheme of the given sub-signal, and the given sub-signal is either the first sub-signal or the second sub-signal.

In one subembodiment of the above embodiment, the second factor is at least a functional relation with a transmission scheme of the given sub-signal.

In one subembodiment of the above embodiment, the second factor is at least a mapping relation with a transmission scheme of the given sub-signal.

In one subembodiment of the above embodiment, the first node obtains the second factor by looking up a table according to the transmission scheme of at least a given sub-signal.

In one embodiment, the meaning of the phrase that "the second factor is related to a number of layer(s) of a given sub-signal" comprises: the second factor is at least a functional relation with a number of layer(s) of the given sub-signal.

In one embodiment, the meaning of the phrase that "the second factor is related to a number of layer(s) of a given sub-signal" comprises: the second factor is at least a mapping relation with a number of layer(s) of the given sub-signal.

In one embodiment, the meaning of the phrase that "the second factor is related to a number of layer(s) of a given sub-signal" comprises: the first node obtains the second factor by looking up a table according to at least a number of layer(s) of the given sub-signal.

In one embodiment, the meaning of the phrase that "the second factor is related to a number of layer(s) of a given sub-signal" comprises: when a number of layer(s) of the given sub-signal is equal to 1, 2, 3, and 4, respectively, the second factor is equal to 0, 3, 4.77, and 6, respectively.

In one embodiment, the meaning of the phrase that "the second factor is related to a number of layer(s) of a given sub-signal" comprises: the transmission scheme for the given sub-signal is full coherent codebook based uplink transmission; when a number of layer(s) of the given sub-signal is equal to 1, 2, 3, and 4, respectively, the second factor is equal to 0, 3, 4.77, and 6, respectively.

In one embodiment, the meaning of the phrase that "the second factor is related to a number of layer(s) of a given sub-signal" comprises: the transmission scheme for the given sub-signal is partial coherent codebook based uplink transmission; when a number of layer(s) of the given sub-signal is equal to 1, 2, 3, and 4, respectively, the second factor is equal to 0, $3Q_p-3$, $3Q_p-3$ and $3Q_p$, respectively.

In one embodiment, the meaning of the phrase that "the second factor is related to a number of layer(s) of a given sub-signal" comprises: a transmission scheme for the given sub-signal is either non-coherent codebook based uplink transmission or non-codebook based uplink transmission; when a number of layer(s) of the given sub-signal is equal to 1, 2, 3, and 4, respectively, the second factor is equal to 0, $3Q_p-3$, $3Q_p-3$ and $3Q_p-3$, respectively.

In one embodiment, the meaning of the phrase that "the second factor is related to a number of layer(s) of a given sub-signal" comprises: the second factor is equal to a dB value of a number of layer(s) of the given sub-signal.

In one subembodiment of the above embodiment, the transmission scheme for the given sub-signal is full coherent codebook based uplink transmission.

In one embodiment, the meaning of the phrase that "the second factor is related to a number of layer(s) of a given sub-signal" comprises: the second factor is linearly correlated with a dB value of a number of layer(s) of the given sub-signal.

In one subembodiment of the above embodiment, the transmission scheme for the given sub-signal is full coherent codebook based uplink transmission.

In one embodiment, the given sub-signal is either the first sub-signal or the second sub-signal.

Embodiment 9

Embodiment 9 illustrates a schematic diagram of a first factor according to another embodiment of the present application, as shown in FIG. 9.

In one embodiment, the first factor is related to whether there exists a reference signal satisfying a first condition other than the first reference signal among the P reference signals; when there exists a reference signal satisfying the first condition other than the first reference signal among the P reference signals, the first factor is equal to a sum of a second factor and a third factor; when there does not exist a reference signal satisfying the first condition other than the first reference signal among the P reference signals, the first factor is equal to the second factor; the first condition comprises: occupied time-domain resources comprise time-domain resources occupied by the first RE, and a corresponding antenna port and the first antenna port are respectively associated with different reference signal resource groups in the first reference signal resource group and the second reference signal resource group; when the first antenna port is associated with the first reference signal resource group, the second factor is related to the number of layer(s) of the first sub-signal; when the first antenna port is associated with the second reference signal resource group, the second factor is related to the number of layer(s) of the second sub-signal.

In one embodiment, antenna port(s) corresponding to the P reference signals is(are) associated with same time-domain resources occupied by all reference signals in a same reference signal resource group in the first reference signal resource group and the second reference signal resource group.

Embodiment 10

Figure 10:
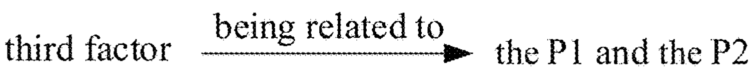
FIG. 10 illustrates a schematic diagram of a third factor according to one embodiment of the present application.

Embodiment 10 illustrates a schematic diagram of a third factor according to one embodiment of the present application, as shown in FIG. 10.

In embodiment 10, the third factor is related to the P1 and the P2.

Typically, the third factor is a positive real number.

Typically, the third factor is measured by dB.

In one embodiment, the meaning of the phrase that "the third factor is related to P1 and the P2" comprises: the third factor is a functional relation with P1 to P2.

In one embodiment, the meaning of the phrase that "the third factor is related to P1 and the P2" comprises: the third factor is a mapping relation with P1 to P2.

In one embodiment, the meaning of the phrase that "the third factor is related to P1 and the P2" comprises: the first node obtains the third factor by looking up a table according to P1 and P2.

In one embodiment, when the first antenna port is associated with the first reference signal resource group, a number of layer(s) of the first sub-signal is equal to 1, P1 is equal to 1, and P2 is equal to 1, the second factor is equal to 0, and the third factor is equal to 3.

In one embodiment, when the first antenna port is associated with the second reference signal resource group, a number of layer(s) of the second sub-signal is equal to 1, P1 is equal to 1, and P2 is equal to 1, the second factor is equal to 0, and the third factor is equal to 3.

In one embodiment, when the first antenna port is associated with the first reference signal resource group, a number of layer(s) of the first sub-signal is equal to 1, P1 is equal to 2, and P2 is equal to 1, the second factor is equal to 0, and the third factor is equal to 1.76.

In one embodiment, when the first antenna port is associated with the second reference signal resource group, a number of layer(s) of the second sub-signal is equal to 1, P1 is equal to 2, and P2 is equal to 1, the second factor is equal to 0, and the third factor is equal to 4.77.

In one embodiment, when the first antenna port is associated with the first reference signal resource group, a number of layer(s) of the first sub-signal is equal to 1, P1 is equal to 1, and P2 is equal to 2, the second factor is equal to 0, and the third factor is equal to 4.77.

In one embodiment, when the first antenna port is associated with the second reference signal resource group, a number of layer(s) of the second sub-signal is equal to 1, P1 is equal to 1, and P2 is equal to 2, the second factor is equal to 0, and the third factor is equal to 1.76.

In one embodiment, when the first antenna port is associated with the first reference signal resource group, a number of layer(s) of the first sub-signal is equal to 1, P1 is equal to 2, and P2 is equal to 2, the second factor is equal to 0, and the third factor is equal to 3.

In one embodiment, when the first antenna port is associated with the second reference signal resource group, a number of layer(s) of the second sub-signal is equal to 1, P1 is equal to 2, and P2 is equal to 2, the second factor is equal to 0, and the third factor is equal to 3.

In one embodiment, when the first antenna port is associated with the first reference signal resource group, a number of layer(s) of the first sub-signal is equal to 2, P1 is equal to 1, and P2 is equal to 1, the second factor is equal to 3, and the third factor is equal to 3.

In one embodiment, when the first antenna port is associated with the second reference signal resource group, a number of layer(s) of the second sub-signal is equal to 2, P1 is equal to 1, and P2 is equal to 1, the second factor is equal to 3, and the third factor is equal to 3.

In one embodiment, when the first antenna port is associated with the first reference signal resource group, a number of layer(s) of the first sub-signal is equal to 2, P1 is equal to 2, and P2 is equal to 1, the second factor is equal to 3, and the third factor is equal to 1.76.

In one embodiment, when the first antenna port is associated with the second reference signal resource group, a number of layer(s) of the second sub-signal is equal to 2, P1 is equal to 2, and P2 is equal to 1, the second factor is equal to 3, and the third factor is equal to 4.77.

In one embodiment, when the first antenna port is associated with the first reference signal resource group, a number of layer(s) of the first sub-signal is equal to 2, P1 is equal to 1, and P2 is equal to 2, the second factor is equal to 3, and the third factor is equal to 4.77.

In one embodiment, when the first antenna port is associated with the second reference signal resource group, a number of layer(s) of the second sub-signal is equal to 2, P1 is equal to 1, and P2 is equal to 2, the second factor is equal to 3, and the third factor is equal to 1.76.

In one embodiment, when the first antenna port is associated with the first reference signal resource group, a number of layer(s) of the first sub-signal is equal to 2, P1 is equal to 2, and P2 is equal to 2, the second factor is equal to 3, and the third factor is equal to 3.

In one embodiment, when the first antenna port is associated with the second reference signal resource group, a number of layer(s) of the second sub-signal is equal to 2, P1 is equal to 2, and P2 is equal to 2, the second factor is equal to 3, and the third factor is equal to 3.

Embodiment 11

Figure 11:
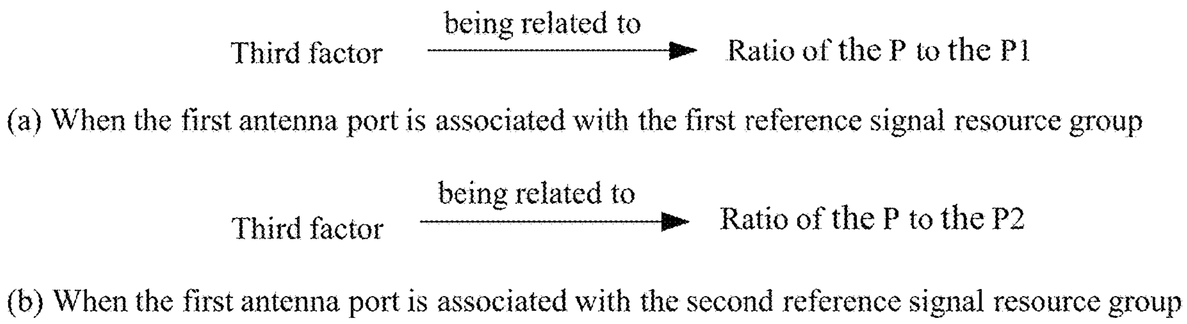
FIG. 11 illustrates a schematic diagram of a third factor according to another embodiment of the present application.

Embodiment 11 illustrates a schematic diagram of a third factor according to another embodiment of the present application, as shown in FIG. 11.

In embodiment 11, the third factor is related to whether the first antenna port is associated with the first reference signal resource group or is associated with the second reference signal resource group; when the first antenna port is associated with the first reference signal resource group, the third factor is related to a ratio of the P to the P1; when the first antenna port is associated with the second reference signal resource group, the third factor is related to a ratio of the P to the P2.

In one embodiment, the meaning of the phrase that "the third factor is related to a ratio of P to P1" comprises: the third factor is linearly correlated with a ratio of P to P1; the meaning of the phrase that "the third factor is related to a ratio of the P to the P2" comprises: the third factor is linearly correlated with a ratio of P to P2.

In one embodiment, the meaning of the phrase that "the third factor is related to a ratio of P to P1" comprises: the third factor is equal to a ratio of P to P1; the meaning of the phrase that "the third factor is related to a ratio of the P to the P2" comprises: the third factor is equal to a ratio of P to P2.

In one embodiment, the meaning of the phrase that "the third factor is related to a ratio of P to P1" comprises: the third factor is a functional relation with a ratio of P to P1; the meaning of the phrase that "the third factor is related to a ratio of the P to the P2" comprises: the third factor is a functional relation with a ratio of P to P2.

In one embodiment, the meaning of the phrase that "the third factor is related to a ratio of P to P1" comprises: the third factor is a mapping relation with a ratio of P to P1; the meaning of the phrase that "the third factor is related to a ratio of the P to the P2" comprises: the third factor is a mapping relation with a ratio of P to P2.

In one embodiment, the meaning of the phrase that "the third factor is related to a ratio of P to P1" comprises: the first node obtains the third factor by looking up a table according to a ratio of P and P1; the meaning of the phrase that "the third factor is related to a ratio of the P to the P2" comprises: the first node obtains the third factor by looking up a table according to a ratio of P and P2.

Embodiment 12

Figure 12:
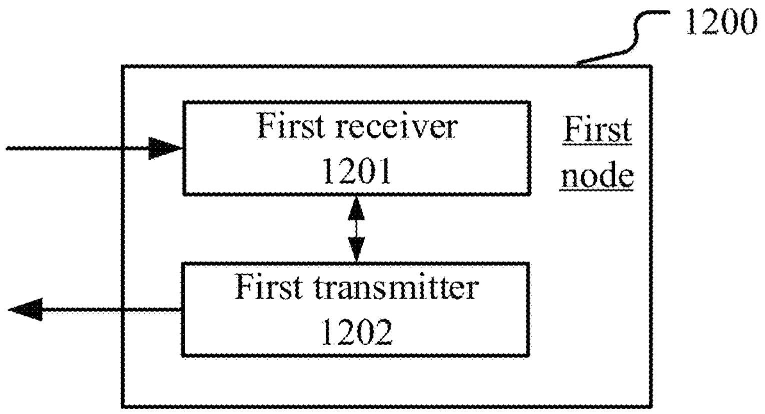
FIG. 12 illustrates a structure block diagram of a processor in a first node according to one embodiment of the present application.

Embodiment 12 illustrates a structure block diagram of a processor in a first node according to one embodiment of the present application, as shown in FIG. 12. In FIG. 12, a processor 1200 in a first node comprises a first receiver 1201 and a first transmitter 1202.

In one embodiment, the first node is a UE.

In one embodiment, the first node is a relay node.

In one embodiment, the first receiver 1201 comprises at least one of the antenna 452, the receiver 454, the receiving processor 456, the multi-antenna receiving processor 458, the controller/processor 459, the memory 460, or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460, or the data source 467 in Embodiment 4.

The first receiver 1201 receives a first signaling, the first signaling is used to indicate a target time-frequency resource block;

the first transmitter 1202 transmits a target signal and a target reference signal group in the target time-frequency resource block;

in embodiment 12, the target time-frequency resource block comprises multiple REs; the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, and the P reference signals are respectively transmitted by P antenna ports, P being a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

In one embodiment, a ratio of the transmit power of the first reference signal on the first RE to a reference power is equal to the linear value of the first factor; the reference power is related to whether the first antenna port is associated with the first reference signal resource group or is associated with the second reference signal resource group; when the first antenna port is associated with the first reference signal resource group, the reference power is transmit power of the first sub-signal per layer per RE; when the first antenna port is associated with the second reference signal resource group, the reference power is transmit power of the second sub-signal per layer per RE.

In one embodiment, P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; when the first antenna port is associated with the first reference signal resource group, the first factor is also related to the P and the P1; when the first antenna port is associated with the second reference signal resource group, the first factor is also related to the P and the P2.

In one embodiment, the first factor is equal to a sum of a second factor and a third factor; when the first antenna port is associated with the first reference signal resource group, the second factor is related to the number of layer(s) of the first sub-signal, and the third factor is related to a ratio of the P to the P1; when the first antenna port is associated with the second reference signal resource group, the second factor is related to the number of layer(s) of the second sub-signal, and the third factor is related to a ratio of the P to the P2.

In one embodiment, the first factor is related to whether there exists a reference signal satisfying a first condition other than the first reference signal among the P reference signals; when there exists a reference signal satisfying the first condition other than the first reference signal among the P reference signals, the first factor is equal to a sum of a second factor and a third factor; when there does not exist a reference signal satisfying the first condition other than the first reference signal among the P reference signals, the first factor is equal to the second factor; the first condition comprises: occupied time-domain resources comprise time-domain resources occupied by the first RE, and a corresponding antenna port and the first antenna port are respectively associated with different reference signal resource groups in the first reference signal resource group and the second reference signal resource group; when the first antenna port is associated with the first reference signal resource group, the second factor is related to the number of layer(s) of the first sub-signal; when the first antenna port is associated with the second reference signal resource group, the second factor is related to the number of layer(s) of the second sub-signal.

In one embodiment, the third factor is related to the P1 and the P2;

or, the third factor is related to whether the first antenna port is associated with the first reference signal resource group or is associated with the second reference signal resource group; when the first antenna port is associated with the first reference signal resource group, the third factor is related to a ratio of the P to the P1; when the first antenna port is associated with the second reference signal resource group, the third factor is related to a ratio of the P to the P2.

In one embodiment, the first transmitter 1202 transmits a first demodulation reference signal and a second demodulation reference signal in the target time-frequency resource block; herein, the phrase that "the first antenna port is associated with the first reference signal resource group" comprises: the first antenna port is associated with an antenna port of the first demodulation reference signal; the phrase that "the first antenna port is associated with the second reference signal resource group" comprises: the first antenna port is associated with an antenna port of the second demodulation reference signal.

Embodiment 13

Figure 13:
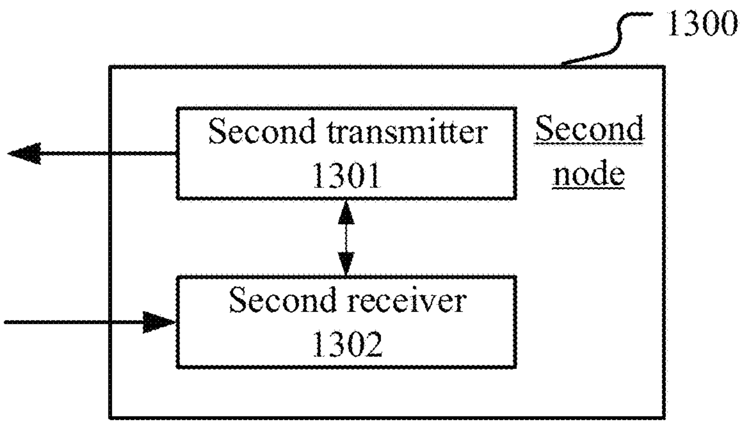
FIG. 13 illustrates a structure block diagram of a processor in a second node according to one embodiment of the present application.

Embodiment 13 illustrates a structure block diagram of a processor in a second node according to one embodiment of the present application, as shown in FIG. 13. In FIG. 13, a processor 1300 of a second node comprises a second transmitter 1301 and a second receiver 1302.

In one embodiment, the second node is a base station.

In one embodiment, the second node is a relay node.

In one embodiment, the second transmitter 1301 comprises at least one of the antenna 420, the transmitter 418, the transmitting processor 416, the multi-antenna transmitting processor 471, the controller/processor 475, or the memory 476 in Embodiment 4.

In one embodiment, the second receiver 1302 comprises at least one of the antenna 420, the receiver 418, the receiving processor 470, the multi-antenna receiving processor 472, the controller/processor 475, the memory 476 in Embodiment 4.

The second transmitter 1301 transmits a first signaling, and the first signaling is used to indicate a target time-frequency resource block;

the second receiver 1302 receives a target signal and a target reference signal group in the target time-frequency resource block;

in embodiment 13, the target time-frequency resource block comprises multiple REs; the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, and the P reference signals are respectively transmitted by P antenna ports, P being a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

In one embodiment, a ratio of the transmit power of the first reference signal on the first RE to a reference power is equal to the linear value of the first factor; the reference power is related to whether the first antenna port is associated with the first reference signal resource group or is associated with the second reference signal resource group; when the first antenna port is associated with the first reference signal resource group, the reference power is transmit power of the first sub-signal per layer per RE; when the first antenna port is associated with the second reference signal resource group, the reference power is transmit power of the second sub-signal per layer per RE.

In one embodiment, P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; when the first antenna port is associated with the first reference signal resource group, the first factor is also related to the P and the P1; when the first antenna port is associated with the second reference signal resource group, the first factor is also related to the P and the P2.

In one embodiment, the first factor is equal to a sum of a second factor and a third factor; when the first antenna port is associated with the first reference signal resource group, the second factor is related to the number of layer(s) of the first sub-signal, and the third factor is related to a ratio of the P to the P1; when the first antenna port is associated with the second reference signal resource group, the second factor is related to the number of layer(s) of the second sub-signal, and the third factor is related to a ratio of the P to the P2.

In one embodiment, the first factor is related to whether there exists a reference signal satisfying a first condition other than the first reference signal among the P reference signals; when there exists a reference signal satisfying the first condition other than the first reference signal among the P reference signals, the first factor is equal to a sum of a second factor and a third factor; when there does not exist a reference signal satisfying the first condition other than the first reference signal among the P reference signals, the first factor is equal to the second factor; the first condition comprises: occupied time-domain resources comprise time-domain resources occupied by the first RE, and a corresponding antenna port and the first antenna port are respectively associated with different reference signal resource groups in the first reference signal resource group and the second reference signal resource group; when the first antenna port is associated with the first reference signal resource group, the second factor is related to the number of layer(s) of the first sub-signal; when the first antenna port is associated with the second reference signal resource group, the second factor is related to the number of layer(s) of the second sub-signal.

In one embodiment, the third factor is related to the P1 and the P2;

or, the third factor is related to whether the first antenna port is associated with the first reference signal resource group or is associated with the second reference signal resource group; when the first antenna port is associated with the first reference signal resource group, the third factor is related to a ratio of the P to the P1; when the first antenna port is associated with the second reference signal resource group, the third factor is related to a ratio of the P to the P2.

In one embodiment, the second receiver 1302 receives a first demodulation reference signal and a second demodulation reference signal in the target time-frequency resource block; herein, the phrase that "the first antenna port is associated with the first reference signal resource group" comprises: the first antenna port is associated with an antenna port of the first demodulation reference signal; the phrase that "the first antenna port is associated with the second reference signal resource group" comprises: the first antenna port is associated with an antenna port of the second demodulation reference signal.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The user equipment, terminal and UE include but are not limited to Unmanned Aerial Vehicles (UAVs), communication modules on UAVs, telecontrolled aircrafts, aircrafts, diminutive airplanes, mobile phones, tablet computers, notebooks, vehicle-mounted communication equipment, wireless sensors, network cards, Internet of Things (IoT) terminals, RFID terminals, NB-IoT terminals, Machine Type Communication (MTC) terminals, enhanced MTC (eMTC) terminals, data card, network cards, vehicle-mounted communication equipment, low-cost mobile phones, low-cost tablets and other wireless communication devices. The UE and terminal in the present application include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IoT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any changes and modifications made based on the embodiments described in the specification, if similar partial or complete technical effects can be achieved, shall be deemed obvious and fall within the scope of protection of the present invention.

What is claimed is:

1. A first node for wireless communications, comprising:

a first receiver, receiving a first signaling, the first signaling being used to indicate a target time-frequency resource block; and a first transmitter, transmitting a target signal and a target reference signal group in the target time-frequency resource block;

wherein the target time-frequency resource block comprises multiple Resource Elements (REs); the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, the P reference signals are transmitted by P antenna ports respectively, where P is a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

2. The first node according to claim 1, wherein a ratio of the transmit power of the first reference signal on the first RE to a reference power is equal to the linear value of the first factor; the reference power is related to whether the first antenna port is associated with the first reference signal resource group or is associated with the second reference signal resource group; when the first antenna port is associated with the first reference signal resource group, the reference power is transmit power of the first sub-signal per layer per RE; when the first antenna port is associated with the second reference signal resource group, the reference power is transmit power of the second sub-signal per layer per RE.

3. The first node according to claim 1, wherein P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; wherein when the first antenna port is associated with the first reference signal resource group, the first factor is also related to the P and the P1; when the first antenna port is associated with the second reference signal resource group, the first factor is also related to the P and the P2;

or, the first factor is equal to a sum of a second factor and a third factor; when the first antenna port is associated with the first reference signal resource group, the second factor is related to the number of layer(s) of the first sub-signal, and the third factor is related to a ratio of the P to the P1; when the first antenna port is associated with the second reference signal resource group, the second factor is related to the number of layer(s) of the second sub-signal, and the third factor is related to a ratio of the P to the P2.

4. The first node according to claim 1, wherein the first factor is related to whether there exists a reference signal satisfying a first condition other than the first reference signal among the P reference signals; when there exists a reference signal satisfying the first condition other than the first reference signal among the P reference signals, the first factor is equal to a sum of a second factor and a third factor; when there does not exist a reference signal satisfying the first condition other than the first reference signal among the P reference signals, the first factor is equal to the second factor; the first condition comprises: occupied time-domain resources comprise time-domain resources occupied by the first RE, and a corresponding antenna port and the first antenna port are respectively associated with different reference signal resource groups in the first reference signal resource group and the second reference signal resource group; when the first antenna port is associated with the first reference signal resource group, the second factor is related to the number of layer(s) of the first sub-signal; when the first antenna port is associated with the second reference signal resource group, the second factor is related to the number of layer(s) of the second sub-signal.

5. The first node according to claim 4, wherein P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; wherein the third factor is related to the P1 and the P2;

or, the third factor is related to whether the first antenna port is associated with the first reference signal resource group or is associated with the second reference signal resource group; when the first antenna port is associated with the first reference signal resource group, the third factor is related to a ratio of the P to the P1;

when the first antenna port is associated with the second reference signal resource group, the third factor is related to a ratio of the P to the P2.

6. The first node according to claim 1, wherein the first transmitter transmits a first demodulation reference signal and a second demodulation reference signal in the target time-frequency resource block; wherein the phrase that "the first antenna port is associated with the first reference signal resource group" comprises: the first antenna port is associated with an antenna port of the first demodulation reference signal; the phrase that "the first antenna port is associated with the second reference signal resource group" comprises: the first antenna port is associated with an antenna port of the second demodulation reference signal.

7. A second node for wireless communications, comprising:

a second transmitter, transmitting a first signaling, the first signaling being used to indicate a target time-frequency resource block; and a second receiver, receiving a target signal and a target reference signal group in the target time-frequency resource block;

wherein the target time-frequency resource block comprises multiple REs; the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, the P reference signals are transmitted by P antenna ports respectively, where P is a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

8. The second node according to claim 7, wherein a ratio of the transmit power of the first reference signal on the first RE to a reference power is equal to the linear value of the first factor; the reference power is related to whether the first antenna port is associated with the first reference signal resource group or is associated with the second reference signal resource group; when the first antenna port is associated with the first reference signal resource group, the reference power is transmit power of the first sub-signal per layer per RE; when the first antenna port is associated with the second reference signal resource group, the reference power is transmit power of the second sub-signal per layer per RE;

or,

P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; wherein when the first antenna port is associated with the first reference signal resource group, the first factor is also related to the P and the P1; when the first antenna port is associated with the second reference signal resource group, the first factor is also related to the P and the P2;

or, the first factor is equal to a sum of a second factor and a third factor; when the first antenna port is associated with the first reference signal resource group, the second factor is related to the number of layer(s) of the first sub-signal, and the third factor is related to a ratio of the P to the P1; when the first antenna port is associated with the second reference signal resource group, the second factor is related to the number of layer(s) of the second sub-signal, and the third factor is related to a ratio of the P to the P2.

9. The second node according to claim 7, wherein the first factor is related to whether there exists a reference signal satisfying a first condition other than the first reference signal among the P reference signals; when there exists a reference signal satisfying the first condition other than the first reference signal among the P reference signals, the first factor is equal to a sum of a second factor and a third factor; when there does not exist a reference signal satisfying the first condition other than the first reference signal among the P reference signals, the first factor is equal to the second factor; the first condition comprises: occupied time-domain resources comprise time-domain resources occupied by the first RE, and a corresponding antenna port and the first antenna port are respectively associated with different reference signal resource groups in the first reference signal resource group and the second reference signal resource group; when the first antenna port is associated with the first reference signal resource group, the second factor is related to the number of layer(s) of the first sub-signal; when the first antenna port is associated with the second reference signal resource group, the second factor is related to the number of layer(s) of the second sub-signal; P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; wherein the third factor is related to the P1 and the P2;

or, the third factor is related to whether the first antenna port is associated with the first reference signal resource group or is associated with the second reference signal resource group; when the first antenna port is associated with the first reference signal resource group, the third factor is related to a ratio of the P to the P1; when the first antenna port is associated with the second reference signal resource group, the third factor is related to a ratio of the P to the P2.

10. The second node according to claim 7, comprising:

receiving a first demodulation reference signal and a second demodulation reference signal in the target time-frequency resource block;

wherein the phrase that "the first antenna port is associated with the first reference signal resource group" comprises: the first antenna port is associated with an antenna port of the first demodulation reference signal; the phrase that "the first antenna port is associated with the second reference signal resource group" comprises: the first antenna port is associated with an antenna port of the second demodulation reference signal.

11. A method in a first node for wireless communications, comprising:

receiving a first signaling, the first signaling being used to indicate a target time-frequency resource block; and transmitting a target signal and a target reference signal group in the target time-frequency resource block;

wherein the target time-frequency resource block comprises multiple REs; the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, the P reference signals are transmitted by P antenna ports respectively, where P is a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

12. The method according to claim 11, wherein a ratio of the transmit power of the first reference signal on the first RE to a reference power is equal to the linear value of the first factor; the reference power is related to whether the first antenna port is associated with the first reference signal resource group or is associated with the second reference signal resource group; when the first antenna port is associated with the first reference signal resource group, the reference power is transmit power of the first sub-signal per layer per RE; when the first antenna port is associated with the second reference signal resource group, the reference power is transmit power of the second sub-signal per layer per RE.

13. The method according to claim 11, wherein P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; wherein when the first antenna port is associated with the first reference signal resource group, the first factor is also related to the P and the P1; when the first antenna port is associated with the second reference signal resource group, the first factor is also related to the P and the P2;

or, the first factor is equal to a sum of a second factor and a third factor; when the first antenna port is associated with the first reference signal resource group, the second factor is related to the number of layer(s) of the first sub-signal, and the third factor is related to a ratio of the P to the P1; when the first antenna port is associated with the second reference signal resource group, the second factor is related to the number of layer(s) of the second sub-signal, and the third factor is related to a ratio of the P to the P2.

14. The method according to claim 11, wherein the first factor is related to whether there exists a reference signal satisfying a first condition other than the first reference signal among the P reference signals; when there exists a reference signal satisfying the first condition other than the first reference signal among the P reference signals, the first factor is equal to a sum of a second factor and a third factor; when there does not exist a reference signal satisfying the first condition other than the first reference signal among the P reference signals, the first factor is equal to the second factor; the first condition comprises: occupied time-domain resources comprise time-domain resources occupied by the first RE, and a corresponding antenna port and the first antenna port are respectively associated with different reference signal resource groups in the first reference signal resource group and the second reference signal resource group; when the first antenna port is associated with the first reference signal resource group, the second factor is related to the number of layer(s) of the first sub-signal; when the first antenna port is associated with the second reference signal resource group, the second factor is related to the number of layer(s) of the second sub-signal.

15. The method according to claim 14, wherein P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; wherein the third factor is related to the P1 and the P2;

or, the third factor is related to whether the first antenna port is associated with the first reference signal resource group or is associated with the second reference signal resource group; when the first antenna port is associated with the first reference signal resource group, the third factor is related to a ratio of the P to the P1; when the first antenna port is associated with the second reference signal resource group, the third factor is related to a ratio of the P to the P2.

16. The method according to claim 11, wherein the first transmitter transmits a first demodulation reference signal and a second demodulation reference signal in the target time-frequency resource block; wherein the phrase that "the first antenna port is associated with the first reference signal resource group" comprises: the first antenna port is associated with an antenna port of the first demodulation reference signal; the phrase that "the first antenna port is associated with the second reference signal resource group" comprises: the first antenna port is associated with an antenna port of the second demodulation reference signal.

17. A method in a second node for wireless communications, comprising:

transmitting a first signaling, the first signaling being used to indicate a target time-frequency resource block; and receiving a target signal and a target reference signal group in the target time-frequency resource block;

wherein the target time-frequency resource block comprises multiple REs; the target signal comprises a first sub-signal and a second sub-signal, and a number of layers of the target signal is equal to a sum of a number of layer(s) of the first sub-signal and a number of layer(s) of the second sub-signal; the first signaling is used to indicate a first reference signal resource group and a second reference signal resource group, the first reference signal resource group is used to determine antenna port(s) for transmitting the first sub-signal, and the second reference signal resource group is used to determine antenna port(s) for transmitting the second sub-signal; the target reference signal group comprises P reference signals, the P reference signals are transmitted by P antenna ports respectively, where P is a positive integer greater than 1; a first antenna port is any of the P antenna ports, and a first reference signal is a reference signal transmitted by the first antenna port among the P reference signals; a first RE is any of REs occupied by the first reference signal, and transmit power of the first reference signal on the first RE is linearly correlated with a linear value of a first factor; the first factor is related to whether the first antenna port is associated with the first reference signal resource group or is associated with the second reference signal resource group; when the first antenna port is associated with the first reference signal resource group, the first factor is related to the number of layer(s) of the first sub-signal; when the first antenna port is associated with the second reference signal resource group, the first factor is related to the number of layer(s) of the second sub-signal; the first reference signal resource group comprises at least one reference signal resource, and the second reference signal resource group comprises at least one reference signal resource.

18. The method according to claim 17, wherein a ratio of the transmit power of the first reference signal on the first RE to a reference power is equal to the linear value of the first factor; the reference power is related to whether the first antenna port is associated with the first reference signal resource group or is associated with the second reference signal resource group; when the first antenna port is associated with the first reference signal resource group, the reference power is transmit power of the first sub-signal per layer per RE; when the first antenna port is associated with the second reference signal resource group, the reference power is transmit power of the second sub-signal per layer per RE;

or,

P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; wherein when the first antenna port is associated with the first reference signal resource group, the first factor is also related to the P and the P1; when the first antenna port is associated with the second reference signal resource group, the first factor is also related to the P and the P2;

or, the first factor is equal to a sum of a second factor and a third factor; when the first antenna port is associated with the first reference signal resource group, the second factor is related to the number of layer(s) of the first sub-signal, and the third factor is related to a ratio of the P to the P1; when the first antenna port is associated with the second reference signal resource group, the second factor is related to the number of layer(s) of the second sub-signal, and the third factor is related to a ratio of the P to the P2.

19. The method according to claim 17, wherein the first factor is related to whether there exists a reference signal satisfying a first condition other than the first reference signal among the P reference signals; when there exists a reference signal satisfying the first condition other than the first reference signal among the P reference signals, the first factor is equal to a sum of a second factor and a third factor; when there does not exist a reference signal satisfying the first condition other than the first reference signal among the P reference signals, the first factor is equal to the second factor; the first condition comprises: occupied time-domain resources comprise time-domain resources occupied by the first RE, and a corresponding antenna port and the first antenna port are respectively associated with different reference signal resource groups in the first reference signal resource group and the second reference signal resource group; when the first antenna port is associated with the first reference signal resource group, the second factor is related to the number of layer(s) of the first sub-signal; when the first antenna port is associated with the second reference signal resource group, the second factor is related to the number of layer(s) of the second sub-signal; P1 is a number of antenna port(s) associated with the first reference signal resource group among the P antenna ports, P2 is a number of antenna port(s) associated with the second reference signal resource group among the P antenna ports, and a sum of the P1 and the P2 is equal to the P; wherein the third factor is related to the P1 and the P2;

or, the third factor is related to whether the first antenna port is associated with the first reference signal resource group or is associated with the second reference signal resource group; when the first antenna port is associated with the first reference signal resource group, the third factor is related to a ratio of the P to the P1;

when the first antenna port is associated with the second reference signal resource group, the third factor is related to a ratio of the P to the P2.

20. The method according to claim 17, comprising:

receiving a first demodulation reference signal and a second demodulation reference signal in the target time-frequency resource block;

wherein the phrase that "the first antenna port is associated with the first reference signal resource group" comprises: the first antenna port is associated with an antenna port of the first demodulation reference signal; the phrase that "the first antenna port is associated with the second reference signal resource group" comprises: the first antenna port is associated with an antenna port of the second demodulation reference signal.

* * * * *